(No Model.) 8 Sheets—Sheet 3.

J. F. HEADY & J. H. PATTERSON.
CASH INDICATOR AND REGISTER.

No. 386,401. Patented July 17, 1888.

Witnesses:
W. C. Jirdinston.
Charles Billou.

Inventors:
John F. Heady, and
John H. Patterson,
by Peck & Rector
their Attorneys.

(No Model.) 8 Sheets—Sheet 4.

J. F. HEADY & J. H. PATTERSON.
CASH INDICATOR AND REGISTER.

No. 386,401. Patented July 17, 1888.

Witnesses:
W. C. Jirdinston.
Charles Billon.

Inventors:
John F. Heady, and
John H. Patterson,
by Peck & Rector
Attorneys.

(No Model.) 8 Sheets—Sheet 5.

J. F. HEADY & J. H. PATTERSON.
CASH INDICATOR AND REGISTER.

No. 386,401. Patented July 17, 1888.

Witnesses:
W. C. Jirdinston.
Charles Billon.

Inventors:
John F. Heady, and
John H. Patterson,
by Peck & Rector,
Attorneys.

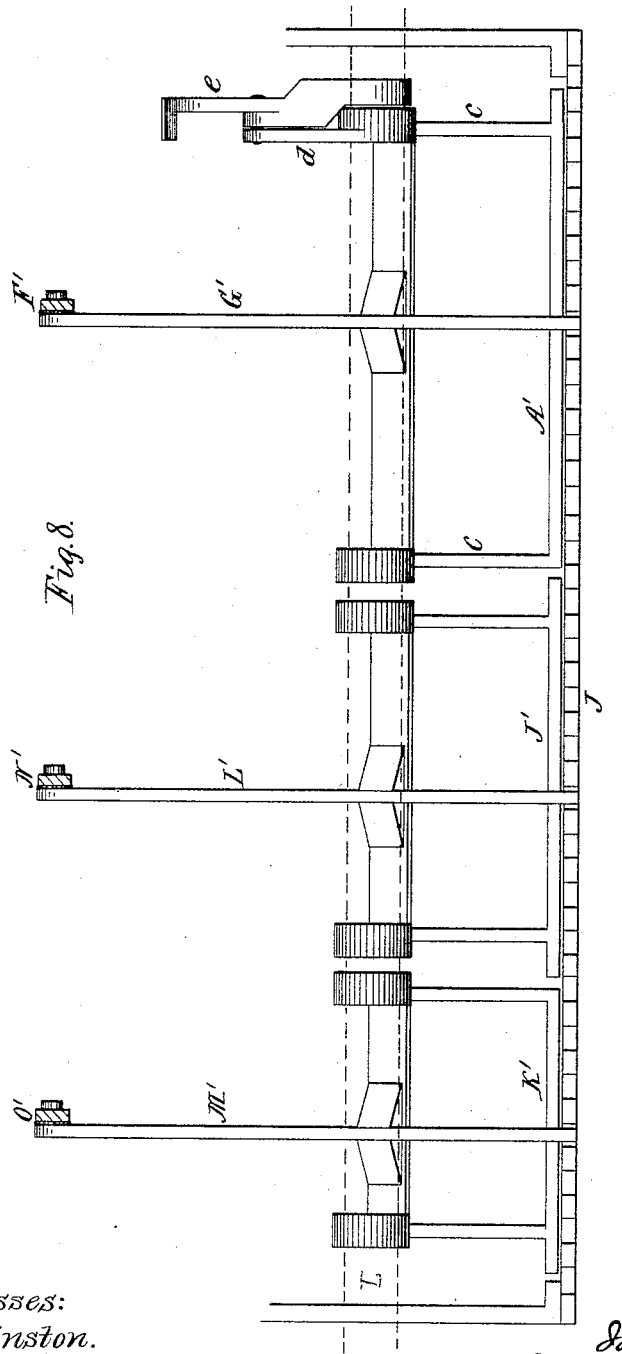

(No Model.) 8 Sheets—Sheet 7.
J. F. HEADY & J. H. PATTERSON.
CASH INDICATOR AND REGISTER.
No. 386,401. Patented July 17, 1888.
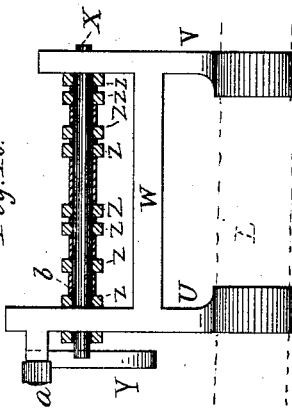
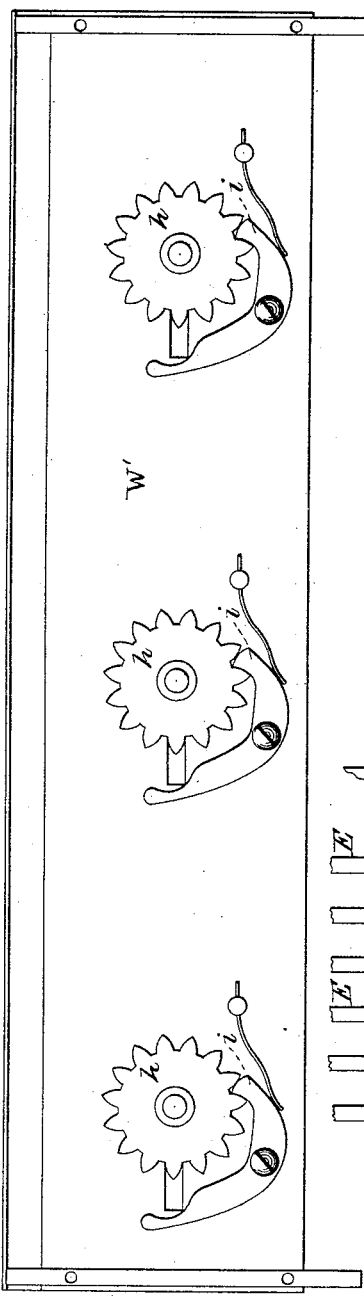
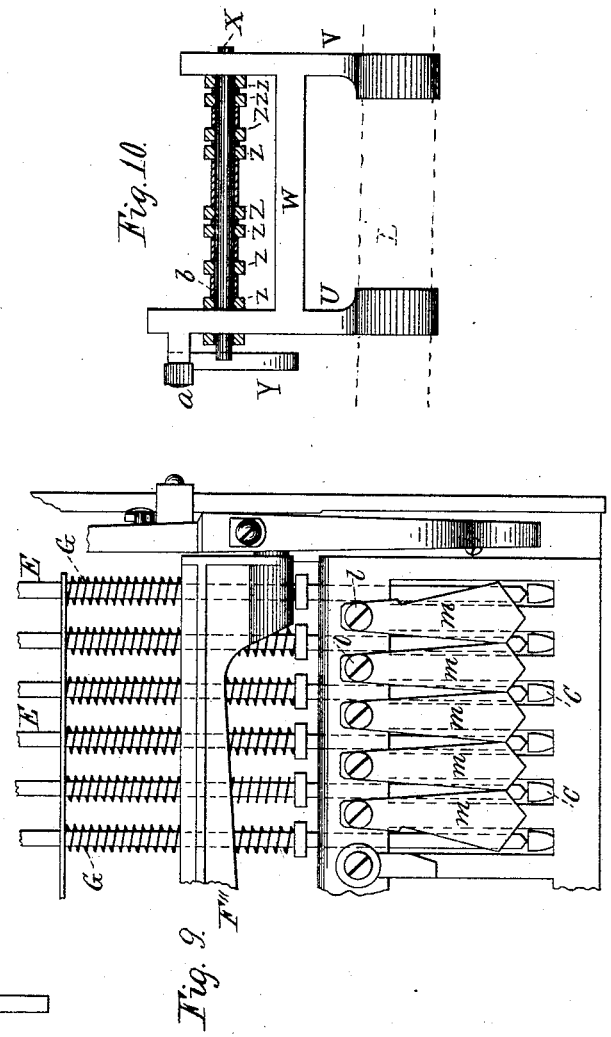
Witnesses:
W. C. Firdinston.
Charles Billon.
Inventors:
John F. Heady, and
John H. Patterson
by Peck & Rector
Attorneys.
N. PETERS, Photo-Lithographer, Washington, D. C.

(No Model.) 8 Sheets—Sheet 8.
J. F. HEADY & J. H. PATTERSON.
CASH INDICATOR AND REGISTER.
No. 386,401. Patented July 17, 1888.
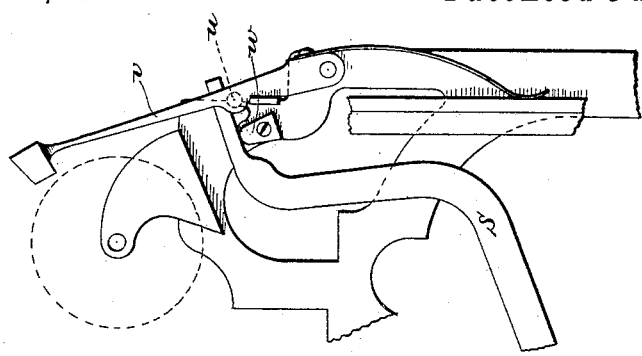
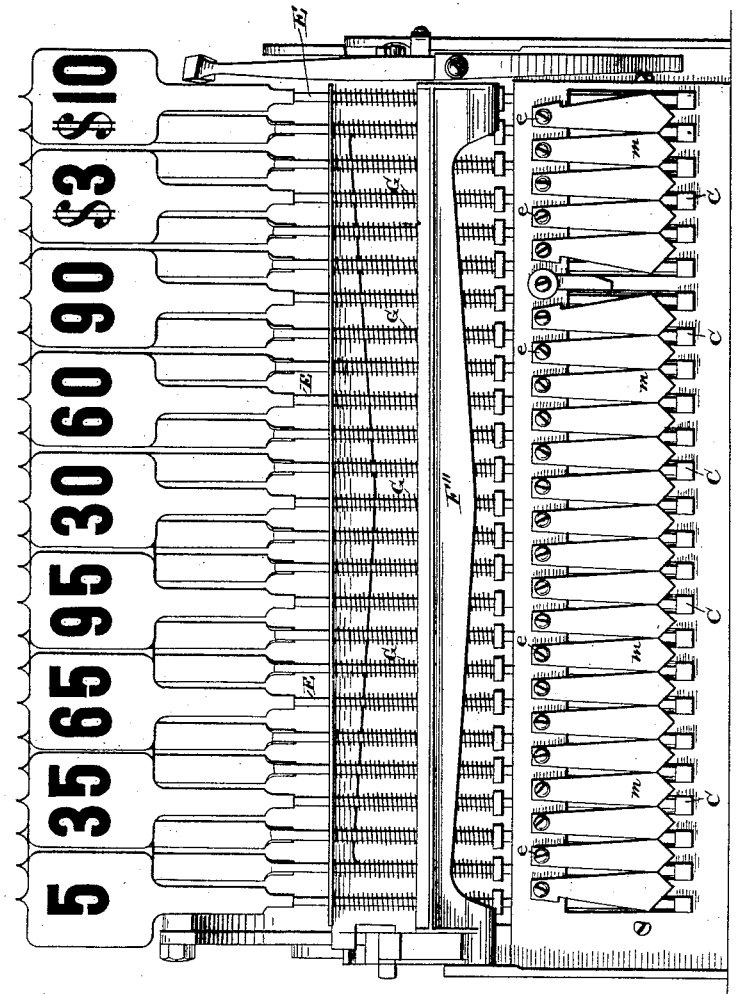

UNITED STATES PATENT OFFICE.

JOHN F. HEADY AND JOHN H. PATTERSON, OF DAYTON, OHIO, ASSIGNORS TO THE NATIONAL CASH REGISTER COMPANY, OF SAME PLACE.

CASH INDICATOR AND REGISTER.

SPECIFICATION forming part of Letters Patent No. 386,401, dated July 17, 1888.

Application filed November 16, 1887. Serial No. 255,312. (No model.)

*To all whom it may concern:*

Be it known that we, JOHN F. HEADY and JOHN H. PATTERSON, citizens of the United States, residing at Dayton, in the county of Montgomery and State of Ohio, have invented certain new and useful Improvements in Cash Registers and Indicators, of which the following is a full, clear, and exact description, reference being had to the accompanying drawings, forming part of this specification.

Our invention relates to improvements in cash registers and indicators designed for the use of store-keepers and others as a means of accurately registering the total receipts for any given period of time and for indicating to the customers that the amounts paid have been registered by disclosing to their view such amounts on figured tablets.

It has for its object an improvement in the construction of this class of machines, and its novelty will be herein set forth, and specifically pointed out in the claims.

Figure 1:
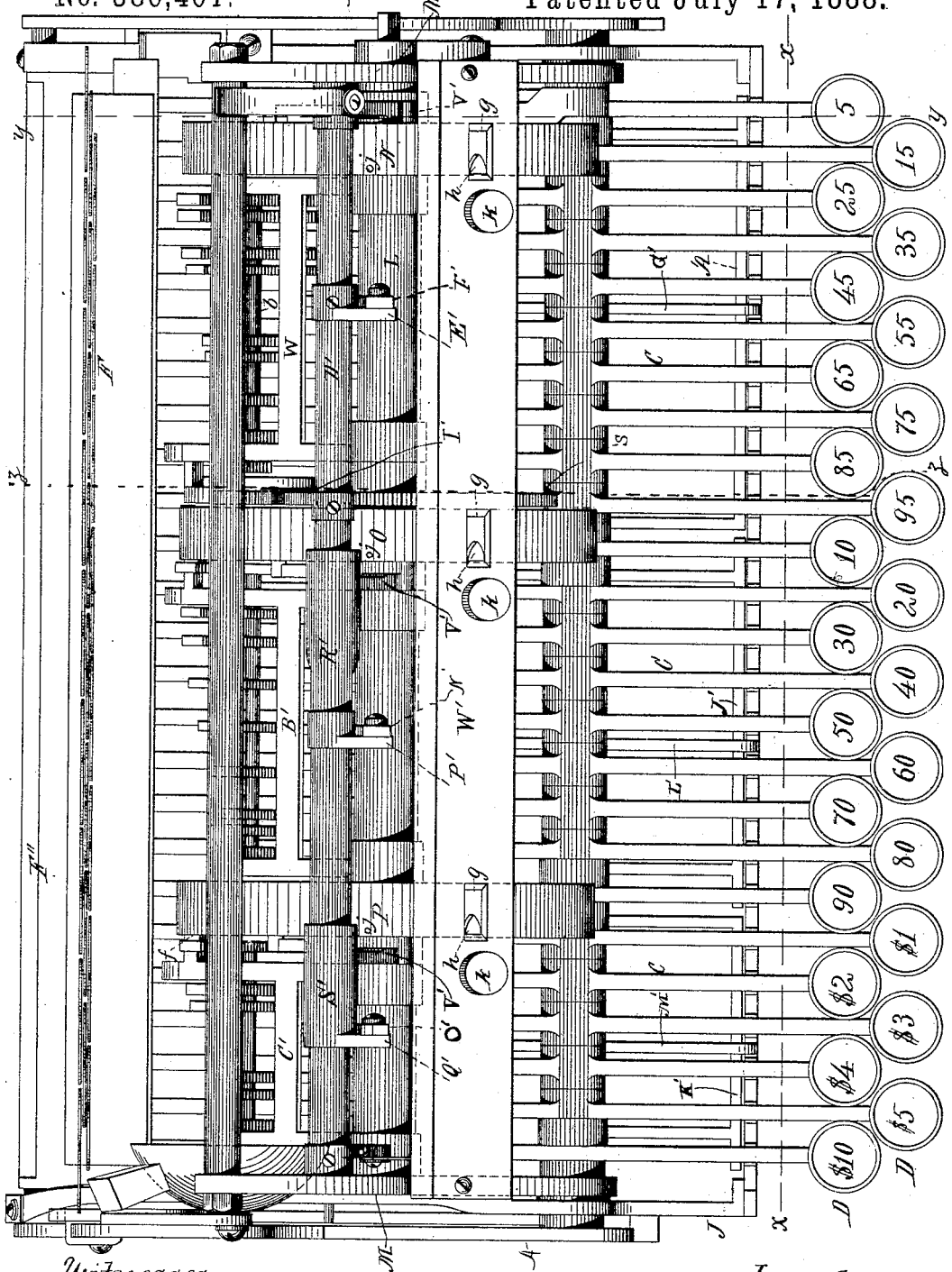
Figure 2:
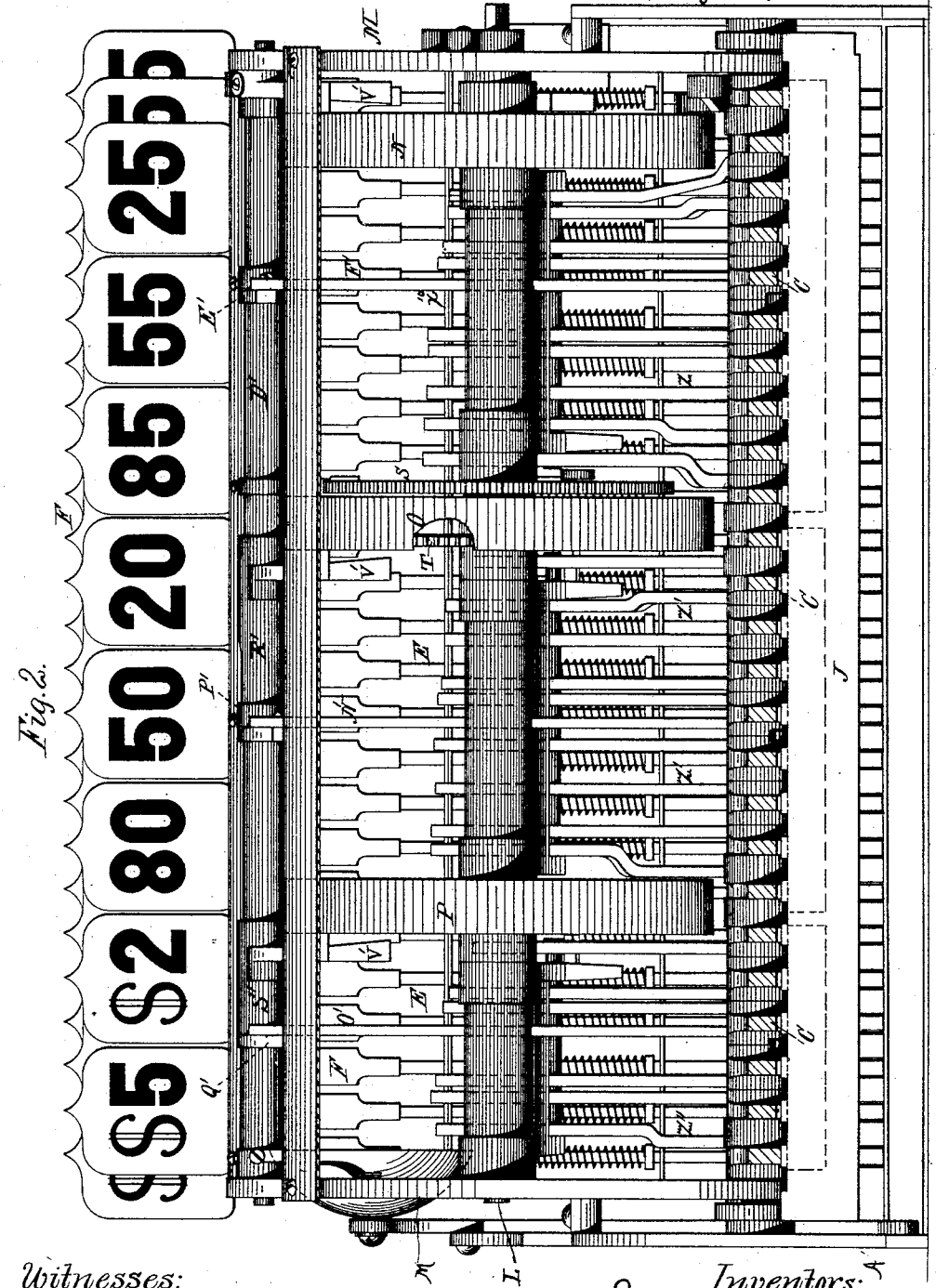
Figure 3:
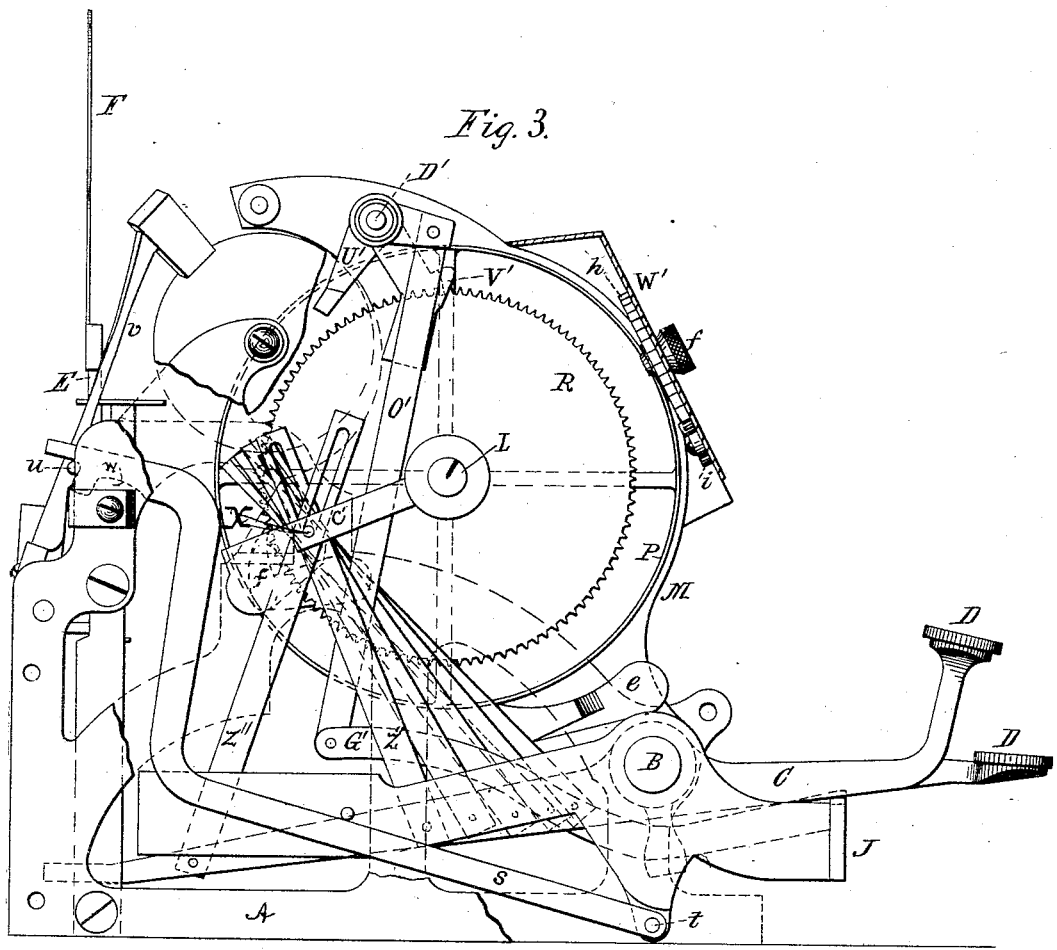
Figure 4:
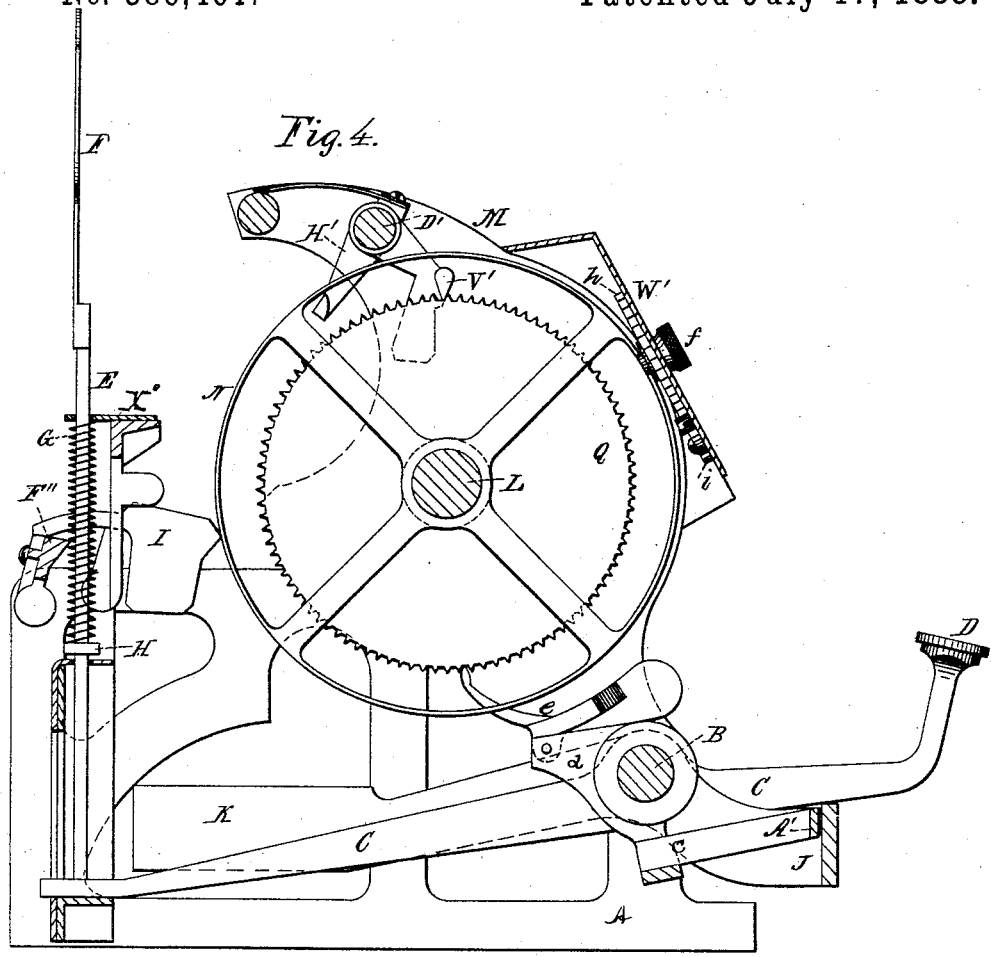
Figure 5:
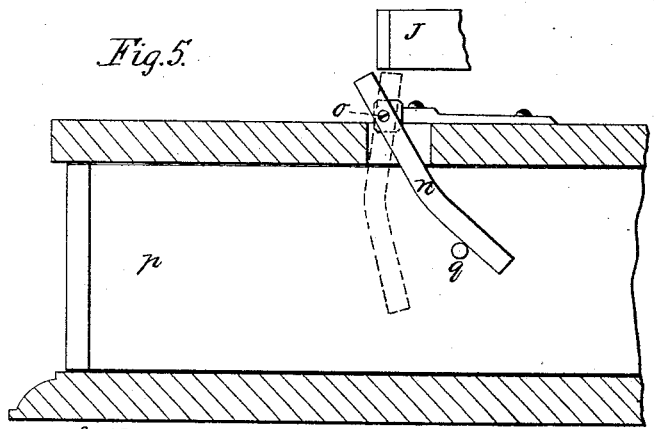
Figure 6:
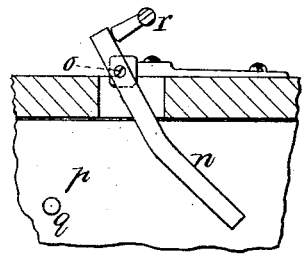
Figure 7:
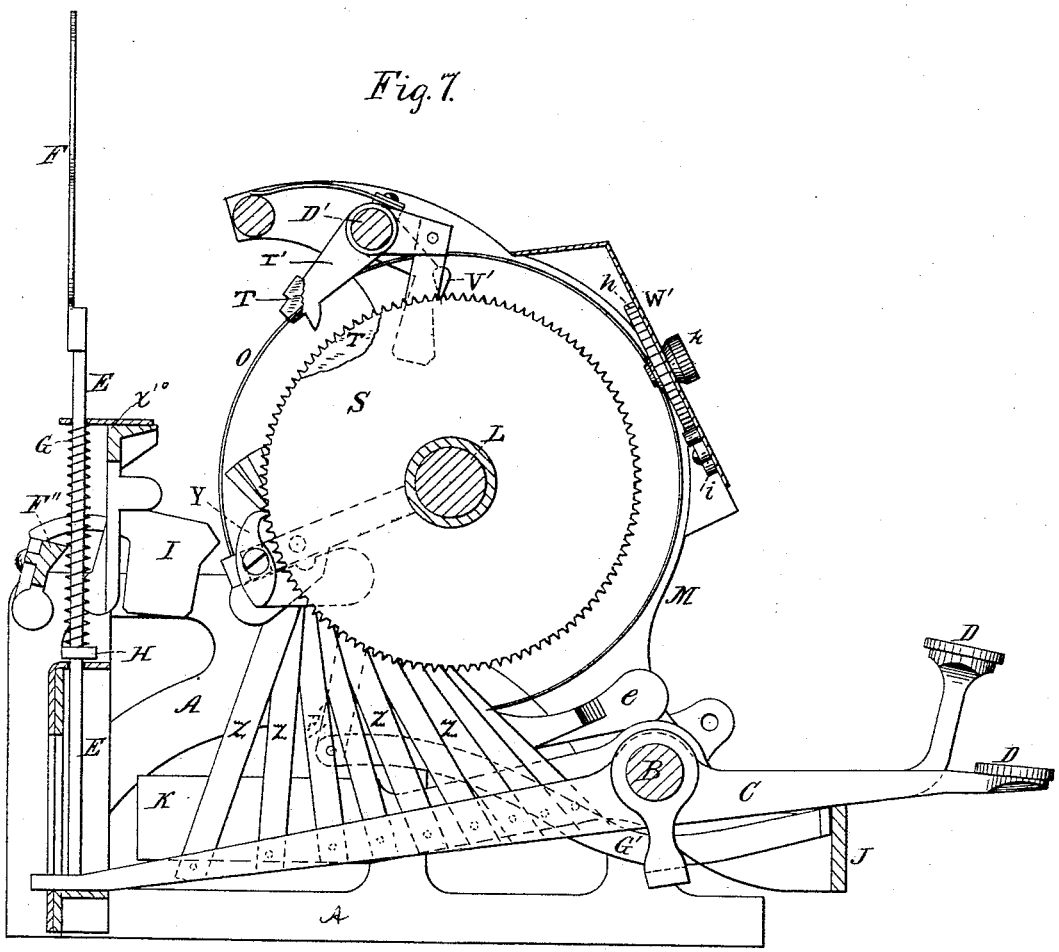

In the accompanying drawings, Figure 1, Sheet 1, is a plan view of a cash register and indicator embodying our present invention removed from its case. Fig. 2, Sheet 2, is a front elevation of the same with the front portion of the keys cut off on the dotted line $x\,x$ of Fig. 1 and with the lower portion of the plate containing the reading-openings cut away. Fig. 3, Sheet 3, is a side elevation of the same with portions of the gong and frame-work broken away. Fig. 4, Sheet 4, is a sectional side elevation of the same through the dotted line $y\,y$ of Fig. 1. Fig. 5, Sheet 4, is a sectional detail view representing the automatic locking mechanism for preventing the operation of the machine except when the drawer is locked. Fig. 6, Sheet 4, is a sectional detail view representing means for throwing the automatic locking mechanism out of action when desired. Fig. 7, Sheet 5, is a sectional side elevation through the dotted line $z\,z$ of Fig. 1. Fig. 8, Sheet 6, is a plan view of the supplementary vibrating frames, together with the front portion of the main vibrating frame. Fig. 9, Sheet 7, is a rear elevation of the lower corner of the machine, showing the means for preventing the operation of more than one of the keys of a group at the same time. Fig. 10, Sheet 7, is a detail view of the vibrating dog-carrier and its dog. Fig. 11, Sheet 7, is a rear elevation of the supplemental registering mechanism. Fig. 12, Sheet 8, is a rear view of the machine, showing the application of the stops to the different sets of series of keys. Fig. 13, Sheet 8, is a detail view of the mechanism for tripping the gong-hammer.

The same letters of reference are used to indicate identical parts in all the figures.

This machine, like others of its class having tablets which are to be exposed to view upon the operation of any key, is contained in a locked case or cabinet, the upper part of which is provided with glass windows, through which the tablets can be seen when exposed, and in the lower part of which is contained a money drawer or till, with mechanism whereby whenever any key is operated said drawer is thrown open, and which cabinet (not here shown) may be of the usual or any suitable construction.

The frame-work A of the machine, properly braced by suitable cross-bars, has secured in its lower front portion a shaft, B, on which the operating-keys C, extending to the back of the machine and projecting through slots in the front of the cabinet, are strung and pivoted. As is customary for utilizing space, these keys at their front ends are arranged in two banks and are provided with numbered buttons D.

Supported vertically in guides $X^{10}$ at the back of the machine are a series of tablet-rods, E, with their lower ends resting one upon each key, and each of which rods is provided at its upper end with a tablet, F, bearing on each side a number corresponding in value with that of the key upon which it rests.

F'' is the usual tablet-supporting wing, G the resetting-springs, and H the detents or shoulders upon the tablet-rods, which are caught by the wing to hold the tablet exposed.

I is the usual retracting-weight for resetting the wing.

J is the main vibrating frame, extending under all of the keys, hung upon the shaft B, and provided with weighted resetting-arms K.

All of the parts thus far described are well known in this class of machines and need no further description.

One feature of our invention relates to the registering mechanism and the means for operating it, and may be described as follows:

Upon a shaft, L, journaled in the secondary frame M of the machine, which is supported upon and carried by the main frame, are three registering-wheels, N O P, which are journaled loosely upon said shaft. Each of these wheels has upon its periphery one hundred numbers, those on the wheel N being the multiples of five from 0 to 495, those on the wheel O the multiples of ten from 0 to 990, and those on the wheel P the multiples of one from 0 to 99, each inclusive. The hub of the wheel N has secured to it a disk, Q, Fig. 4, whose periphery is provided with one hundred teeth. The wheel P likewise has secured to its hub a disk, R, Fig. 3, provided with one hundred teeth, while the wheel O has secured to its hub two similar disks, S T, one on each side, and each provided with one hundred teeth.

Between the wheels N and O there is hung upon the shaft L what we designate a vibrating "dog-carrier." (Illustrated more particularly in Fig. 10.) It is composed of two side arms, U V, whose hubs encircle and are journaled upon the shaft L and a transverse shaft, X, and in this instance is braced by a cross-bar, W. Upon a stud or spindle, $a$, extending from the rear end of the arm U, is pivoted a gravitating dog, Y, which engages with the teeth of the wheel S. In this instance there are nine keys grouped between the registering-wheels N and O, and they represent the odd multiples of five from 15 to 95, inclusive, and for each key there is an arm, Z, whose lower end is pivoted directly to the key and whose upper end is slotted, the shaft X of the dog-carrier extending through said slot. The upper ends of these slotted arms Z may be spaced on the shaft X, to correspond with their lower ends, by means of spools $b$. It will be observed that in this instance the arms at the outer sides of the group are bent to avoid contact with the registering-wheels. These arms Z are pivoted to the operating-keys C at unequal distances from the fulcrum-shaft B of said keys to cause each arm when its key is operated to vibrate the dog-carrier to the proper extent to turn the registering-wheel O the exact number of notches necessary to register the tens of the value of such key on said wheel in the following manner: The arm Z on the fifteen-cent key is pivoted thereto at a point nearer to the fulcrum-shaft B than are any of the other arms of the odd-numbered keys, and this point is at such distance from the fulcrum of said key that when the key is operated its arm Z will vibrate the dog-carrier just sufficiently to turn the wheel O one notch, and thereby register ten cents on said wheel. The arm Z of the next key—the twenty-five-cent key—is pivoted to the key at a point a little farther from the fulcrum-shaft, so that when this key is operated its arm will vibrate the dog-carrier far enough to turn the registering-wheel O two notches, and thereby register twenty cents on said wheel, and so on with all the odd-numbered keys up to and including 95, the amount registered on the wheel O being in each instance five cents less than the value of the key operated. The fives of these odd-numbered keys are registered on the wheel N in the manner and by the means to be now described.

Hung upon the shaft B by arms $c$, Fig. 4, is a five-cent or odd-number carrying bar, A', extending transversely under the forward ends of all of the odd-numbered keys and provided with a rear extension, $d$, to which is pivoted a gravitating dog, $e$, which engages with the toothed wheel Q of the registering-wheel N in such manner that whenever any of the odd-numbered keys from 15 to 95, inclusive, are operated the bar A' is depressed and the dog $e$ actuated to turn the wheel N one notch, and thereby register five cents on said wheel. At the same time, as before explained, the tens of these odd-numbered keys are registered on the wheel O. The five-cent key is pivoted on the shaft B outside of the wheel N. It is not provided with any arm Z nor otherwise connected to the vibrating dog-carrier; but the five-cent bar A' extends under the forward end of this key and is depressed by each operation of the key, and its dog $e$ at each operation of the key turns the wheel N one notch and registers five cents thereon. If desired, however, the five-cent key may have an arm Z pivoted to it and connected to a vibrating dog hung upon the shaft L and engaging with the teeth of the disk Q on the wheel N, so that upon operating the five-cent key the wheel N will be turned one notch to register five cents. In such case the five-cent bar A' need not extend under the five-cent key.

The next group of keys is between the wheels O and P, and consists of the keys indicating multiples of ten from 10 to 90, inclusive. They are provided with a second set of arms, Z', pivoted to the keys at points unequally distant from the fulcrum of the keys and connected to a second vibrating dog-carrier, B', provided with a pivoted dog, (not shown,) engaging with the toothed wheel T of the registering-wheel O, these arms Z' and dog-carrier B' corresponding in construction and relative arrangement to those previously described, so that upon operating any key of this group the dog-carrier B' is vibrated to an extent sufficient to turn the wheel O the exact number of notches necessary to register the value of such key upon said wheel.

Instead of having two toothed disks, S T, secured to the wheel O, with an independent dog-carrier and dog for each disk, one of said dog-carriers being connected to the group of keys indicating odd multiples of five above the first power and the other to the group indicating even multiples of five, the wheel O may be provided with only one toothed disk and one dog-carrier and dog for actuating it. In such case the dog-carrier would extend laterally on each side of the wheel O, with its dog located near its center, and would be connected on one side by the arms Z to the group of keys representing odd multiples of five above the first power and on the other by the arms Z' to the group indicating even multiples of five, and it would be vibrated by the operation of any key of either group to cause its dog to actuate the registering-wheel O, as will be readily understood.

The remaining group of keys, indicating dollars, in this instance 1, 2, 3, 4, 5, and 10, is located between the registering-wheel P and the frame of the machine, and through the medium of a third set of arms, Z'', and a third vibrating dog-carrier, C', provided with a dog, $f$, engaging with the toothed disk R of the wheel P, the value of each of these keys is registered on said wheel, as will be readily understood.

The arms Z, Z', and Z'', instead of being pivoted to the operating-keys of their respective groups at points unequally distant from the fulcrum of said keys, may, to accomplish the same result, be connected to said keys at points equally distant from their fulcrum and have the slots in their upper ends made of unequal length, the lengths of the slots being so adjusted that upon operating any key of a group the bottom wall of the slot in its arm will engage with the shaft of the vibrating dog-carrier at such time as to cause the dog of said carrier to actuate the registering-wheel just sufficiently to register the value of the key operated, as will be readily understood.

The feature of our invention relating to the combination of the five-cent-registering wheel, the ten-cent-registering wheel, the operating-keys, and the five-cent bar is not confined in its application to the machine we have shown and described. It is applicable to other machines which are provided with a five-cent-registering wheel and a ten-cent-registering wheel actuated by a series of keys, whether the connecting mechanism between the keys and the ten-cent wheel be similar to that which we have shown and described or not.

It will also be understood that our invention is not limited to the particular form of the five-cent bar which we have shown and described, it being only necessary that the odd-numbered keys be connected to the five-cent wheel in such manner as to actuate it at each operation of any one of them.

To prevent the registering-wheels by a violent operation of the machine from being revolved more than the exact number of notches necessary to register the value of the key operated, we provide brake mechanism, as follows: A rock-shaft, D', is journaled in the secondary frame across the top of the registering-wheels, and is provided between the wheels N and O with an arm, E', connected by a pivoted link, F', to a rearwardly-extending arm, G', rigidly connected to or formed integral with the five-cent bar A'. Likewise secured to the shaft D' are two dogs, H' I', the former of which is over the toothed disk Q and the latter over the toothed disk S. The arm E' and the dogs H' I' are so adjusted that whenever any key of the first group is operated the vibration of the bar A' will throw up the rear end of the arm G' and cause the oscillation of the rock-shaft D' through the medium of the link F' to cause the dogs H' I' to simultaneously engage with the teeth of the disks Q and S just at the completion of the stroke of the key, thereby forming a positive stop to the registering-wheels N and O and causing the exact amount of the key operated to be registered. The second and third groups of keys are similarly provided with vibrating bars J' K', hung upon the fulcrum-shaft B and having rearward integral extensions L' M', with pivoted links N' O' connecting them to arms P' Q', secured to sleeves R' S', loose upon the shaft D'. The sleeve R' is provided with a brake dog, T', located over the toothed disk T, and the sleeve S' is provided with a similar dog, U', over the toothed disk R in such manner that whenever any key of the second or third group is operated its sleeve will be partially rotated to cause its dog to engage with its corresponding toothed disk, for the purpose before explained. In addition to these brake-dogs there are ordinary weighted holding-dogs, V', hung loosely upon the shaft D', one for each of the disks Q R T, and engaging with the teeth thereof, and which, if desired, may be provided with springs, one of which is shown applied to the dog for the disk Q in Figs. 1 and 4.

The bars J' K', while they correspond in appearance to the five-cent bar A', perform no other function than to operate the brake-dogs. It will be observed that the front ends of the arms G' L' M' extend over the vibrating frame J, by means of which the bars A', J', and K' are reset to their normal position after each operation of the key of their respective groups.

While we have shown and described the brake-dogs for the second and third groups of keys as secured to sleeves loose upon the shaft D', in order that the brake-dogs may be independent in their operation, yet, if desired, the construction may be simplified by securing all of the brake-dogs directly to the shaft D' and dispensing with the sleeves R' S'. In such case the bars I' K' and two of the arms G' L' M' and two of the arms E' P' Q' might also be dispensed with, the remaining arm G', L', or M' being secured directly to the main vibrating frame J. Under such construction all of the brake-dogs would be operated simultaneously by the depression of any key.

It will be understood that this brake mechanism is applicable to other cash-registers which are provided with similar registering-wheels operated by a series of pivoted keys, whether the connecting mechanism between the keys and registering-wheels corresponds to that which we have shown and described or not.

Secured to the secondary frame is a plate, W', extending across all of the registering-wheels in close proximity thereto, and provided with three reading-openings, g, through each of which but a single number on the registering-wheel can be seen. In order to increase the registering capacity of the machine, a toothed disk, h, is pivoted upon the under side of the plate W', one by the side of each reading-opening, in such manner that one tooth of each disk is exposed through its corresponding reading-opening between the end of the reading-opening and the number on the registering-wheel. Each disk h is yieldingly held from rotation by a spring-pressed dog, i, pivoted to the plate, as seen in Fig. 11.

Each of the registering-wheels N O P is provided with a projecting pin, j', that on the wheel N being located in the space between 0 and 4.95, that on the wheel O between 0 and 9.90, and that on the wheel P between 0 and 99. At every complete revolution of one of the registering-wheels its pin comes in contact with a tooth of its corresponding disk h and turns said disk to expose the next tooth through the reading-opening. Each tooth of these disks h bears a number, the numbers on the disk actuated by the wheel N being multiples of five from 0 to 70 and indicating dollars, those on the second and third disks h being multiples of one from 0 to 14 and indicating tens and hundreds of dollars, respectively.

Supposing all the registering-wheels and disks to be set at 0, as the numbers on the wheel N are multiples of five from 0 to 4.95, inclusive, upon a complete revolution of this wheel its pin j turns the corresponding disk h one notch and exposes a tooth bearing the number 5, indicating five dollars. Upon a second complete revolution of the registering-wheel, the next tooth of the disk h, bearing the number 10, is exposed through the reading-opening and indicates ten dollars. The total amount registered on this wheel N and its disk h at any given time is ascertained by adding together the amount indicated by the number on the tooth of the disk h exposed through the reading-opening and the amount indicated by the number on the registering-wheel N which is exposed through the reading-opening at the same time. Thus, if the number on the tooth be 10 and that on the wheel 4.95, it will indicate that fourteen dollars and ninety-five cents has been registered. If the wheel N be then turned one notch farther, its 0 will be exposed, while its pin j will have turned the disk h one notch and a tooth bearing the number 15 will be exposed, and a total of fifteen dollars indicated. Upon one complete revolution of the wheel O, whose numbers are multiples of ten from 0 to 9.90, inclusive, its disk h will be turned, and a tooth bearing the number 1 exposed through the reading-opening. At the same time 0.00 will appear through the reading-opening on the registering-wheel, and with the tooth bearing the number 1 at the immediate left of the 0.00 the amount of $10.00 is clearly indicated. If the wheel O be operated until its number 9.90 be exposed through the reading-opening, this number, with the tooth bearing the number 1 still exposed on the immediate left, will readily indicate $19.90. If the wheel O be then turned one notch farther, 0.00 will again appear through the reading-opening, while its disk h will be turned to expose a tooth bearing the number 2, and thus $20.00 will be clearly indicated. It will thus be seen that the total amount registered on this wheel O and its disk h is always clearly indicated by the numbers exposed through the reading-opening by mere numerical reading, without the necessity of any addition. The same is true of the registering-wheel P, whose numbers are multiples of one from 0 to 99, inclusive. Upon a complete revolution of this wheel its disk h will be turned to expose the tooth bearing the number 1, while 00 will appear on the registering-wheel, thus indicating $100. If the wheel P be further operated until its number 99 is exposed, the tooth bearing the number 1 will continue exposed on the immediate left of the 99, and thus $199 will be indicated. Upon turning the wheel P one notch farther its disk h will be turned to expose a tooth bearing the number 2, while 00 will again appear on the registering-wheel, and $200 be thus indicated.

The disks h are readily reset to 0 at any time by means of the thumb-pieces k.

The numbered teeth on the disks h might be omitted and the numbers placed on the body of the disk, in which event, if only one reading-opening were provided for each disk, its edge should project far enough under the reading-opening to expose one of its numbers at a time through said opening, and the under side of its edge should be provided with a series of projections or teeth to engage with the pin on the registering-wheel. Furthermore, each registering-wheel might be provided with two or more similar series of numbers, with a projecting pin between each series, in which event the numbers on its disk h would be multiples of the amount of each of such series. Thus the wheel N might have five series of numbers, each series being multiples of five from 0 to 95 inclusive, with a projecting pin between each series, so that the disk h for this wheel would be turned one notch for every dollar registered on the wheel N. The numbers on the disk h should then be multiples of one and indicate dollars. In this manner the number on the disk h and that on the wheel N which were exposed through the reading-opening at the same time would always indicate the exact amount registered on said wheel and disk by mere numerical reading without any addition.

By having only ten notches on this disk h, numbered from 0 to 9, inclusive, and providing an additional disk h with ten notches numbered from 0 to 9, inclusive, and indicating tens of dollars, to be turned one notch for every complete revolution of the first disk h, any amount less than one hundred dollars registered on the wheel N and the two disks h might be read off at a glance without any addition, and by providing a third disk with similar notches and numbers any amount less than a thousand dollars would be indicated in numerical order in a similar manner.

Another feature of our invention relates to devices for preventing the operation of two or more keys of a group at the same time, for in machines of this class, where a single registering-wheel is operated by a series of keys of different values, when two or more keys of a group are operated simultaneously the key of the highest value operated is the only one which actuates the registering-wheel, and thus the value of the other key or keys operated simultaneously with it is not registered at all. As a tablet is exposed for each of the two or more keys operated, while the value of only one is registered, without some means of preventing the operation of more than one key at a time a dishonest attendant will be able to register and account for a less amount of cash than he actually receives, while correctly indicating to the customers or third parties, by means of the exposed tablets, the actual amount he has received. By reference to Figs. 8 and 12 one form of device for preventing the simultaneous operation of two or more keys of a group will be seen, and may be thus described:

Suitably pivoted, as at $l$, to the rear part of the frame of the machine are a number of pendent stops, $m$, whose lower edges, just over the rear ends of the keys, are wedge-shaped, as shown. These stops are arranged in as many independent sets as there are independent series or groups of keys—in this instance one set for the dollar-keys and one set for the cent-keys—and they prevent the upward passage of more than one key of a group at a time. For instance, to register five dollars the operator could not depress the four-dollar and the one-dollar keys simultaneously to expose the four-dollar and the one-dollar tablets, (which action would only register four dollars,) but is compelled to operate the five-dollar key and expose the five-dollar tablet, and thereby register five dollars. Upon the operation of any single key of a group the two stops $m$ directly above it would be spread apart to permit the passage between them of the ascending rear end of the key. Upon attempting, however, to operate two keys simultaneously, if they be non-adjacent keys, the intermediate stops would be crowded together and prevent the passage of either key, and if they be adjacent keys the intermediate stop would be equally pressed by both, and thus locked to prevent the passage of either key, as will be readily understood.

This feature of our invention is not confined in its application to the machine we have here shown and described. It is applicable to other cash-registers, but more especially to those whose registering mechanism is of such construction that the operation of two or more keys simultaneously causes the value of the highest one only to be registered. Nor is this feature of our invention limited to the particular form and arrangement of the stops we have shown and described. For instance, the lower ends of the stops, instead of being wedge-shaped, might be rounded or of other suitable shape to permit the passage of one key, but prevent the simultaneous passage of two or more. Again, the stops might be of a similar shape to those shown, but pivoted below the keys and extend up between them. When a single key was operated, it would push the stops aside to permit its passage; but when it was attempted to operate two keys, if they were adjacent, they would become locked on the inclined sides of the intermediate stop, and if they were non-adjacent the intermediate stops would be crowded together to prevent their passage. It is also evident that the stops might be arranged to engage with the keys at other points than their rear ends.

Another feature of our invention (illustrated in Figs. 5 and 6) relates to an automatic lock to prevent the operation of any key of the machine while the cash-drawer is open. A bar, $n$, is pivoted, as at $o$, to the frame of the machine and extends down into the drawer-compartment by the side of the drawer, as shown. The drawer $p$, which is arranged, as is customary in this class of machines, to be unlocked and partially propelled from the case by a weight or spring whenever any key is depressed, is provided with a pin or stud, $q$, upon its side. The bar $n$ and the pin $q$ are so located that when the drawer is pushed in and locked the pin $q$ will press back the lower end of the bar $n$, and thereby throw its upper end out of the way of the front end of the vibrating frame J. Upon the operation of any key and the propulsion of the drawer from the case the bar $n$ will by gravity assume the position shown by the dotted lines in Fig. 5, thereby bringing its upper end directly under the vibrating frame and forming a lock to prevent the depression of said frame until, the drawer having been pushed in and again locked, the bar $n$ will be swung by the pin $q$ out of the way of the vibrating frame. In order that the proprietor may, when desired, throw this bar $n$ permanently out of action, as during a rush of business, an ordinary key, $r$, is provided, which, when inserted through an opening provided in the side of the case and turned, will catch the bar $n$ and swing it and hold it out of the way of the frame J, as seen in Fig. 6. As seen in Figs. 3 and 13, the bell-trip is composed of a single bar, $s$, pivoted, as at $t$, to the lower part of the vibrating frame J, and extending rearwardly and upwardly and then back into engagement with a pin, $u$, on the gong-hammer $v$. The under side of the bell-trip is beveled off, as seen in Fig. 13 and by the dotted line in Fig. 3, and the release of the gong-hammer is effected by this beveled portion riding up on a block, $w$, so placed that just at the completion of the stroke of the key the end of the trip will have been disengaged from the pin $u$ to permit the gong-hammer to strike the gong and the wing, which has been pushed backward by the gong-hammer, to reset itself.

The novel features herein shown and described and not claimed, as well as the various modifications in construction which have been described, are hereby reserved for a future application, to be presently filed.

Having thus fully described our invention, we claim—

1. In a cash register and indicator, the combination, with a registering-wheel and a dog for actuating said wheel, of a series of pivoted keys, a series of arms secured to said keys at points unequally distant from the fulcrum of said keys, and mechanism connecting all of said arms to said actuating-dog, whereby the operation of any one of said keys causes said dog to actuate the registering-wheel to register the value of such key, substantially as described.

2. In a cash register and indicator, the combination, with a registering-wheel and a series of operating-keys, of a vibrating dog-carrier provided with a dog for actuating said registering-wheel, and a series of arms secured at their lower ends to said keys and provided at their upper ends with slots which embrace said vibrating dog-carrier, whereby upon operating any one of said keys its arm vibrates the dog-carrier to cause its dog to actuate the registering-wheel to register the value of such key, substantially as described.

3. In a cash register and indicator, the combination, with a registering-wheel and a series of pivoted operating-keys, of a vibrating dog-carrier provided with a dog for actuating said registering-wheel, and a series of arms pivoted to said keys at points unequally distant from the fulcrum of said keys and connecting said keys with the vibrating dog-carrier, whereby upon operating any one of said keys its arm vibrates the dog carrier to cause its dog to actuate the registering-wheel to register the value of such key, substantially as described.

4. In a cash register and indicator, the combination, with a registering-wheel and a series of pivoted operating-keys, of a vibrating dog-carrier provided with a dog for actuating said registering-wheel, and a series of arms pivoted at their lower ends to said keys at points unequally distant from the fulcrum of said keys and provided at their upper ends with slots which embrace said vibrating dog-carrier, whereby upon operating any one of said keys its arm vibrates the dog-carrier to cause its dog to actuate the registering-wheel to register the value of such key, substantially as described.

5. In a cash register and indicator, the combination, with a registering-wheel and a series of pivoted operating-keys, of a vibrating dog-carrier pivoted concentric with the axis of the registering-wheel and provided with a dog for actuating said wheel, and a series of arms pivoted at their lower ends to said keys and engaging at their upper ends directly with said dog-carrier for communicating different degrees of movement thereto, accordingly as one or another of the keys is operated, substantially as described.

6. In a cash register and indicator, the combination, with a registering-wheel and a series of keys, of a vibrating dog-carrier hung concentric with said registering-wheel and provided with a dog for actuating said wheel, and a series of arms pivoted at their lower ends to said keys and provided at their upper ends with slots which embrace said vibrating dog-carrier, whereby upon operating any one of said keys its arm vibrates the dog-carrier to cause its dog to actuate the registering-wheel to register the value of such key, substantially as described.

7. In a cash register and indicator, the combination, with a registering-wheel and a series of pivoted keys, of a vibrating dog-carrier hung concentric with said registering-wheel and provided with a dog for actuating said wheel, and a series of arms pivoted at their lower ends to said keys at points unequally distant from the fulcrum of said keys and connected at their upper ends with said vibrating dog-carrier, whereby upon operating any one of said keys its arm vibrates the dog-carrier to cause its dog to actuate the registering-wheel to register the value of such key, substantially as described.

8. In a cash register and indicator, the combination, with a registering-wheel and a series of pivoted operating-keys, of a vibrating dog-carrier hung concentric with said registering-wheel and provided with a dog for actuating said wheel, and a series of arms pivoted to said keys at points unequally distant from the fulcrum of said keys and provided at their upper ends with slots engaging with said vibrating dog-carrier, whereby upon operating any one of said keys its arm vibrates the dog-carrier to cause its dog to actuate the registering-wheel to register the value of such key, substantially as described.

9. In a cash register and indicator, the combination of a series of keys indicating odd multiples of five above the first power, a ten-cent-registering wheel actuated by each of said keys, a five-cent-registering wheel, and connecting mechanism between all of said keys and five-cent-registering wheel, whereby upon operating any one of said keys the tens of its value are registered on the ten-cent wheel and the five on the five-cent wheel, substantially as described.

10. In a cash register and indicator, the combination, with a five-cent-registering wheel, a ten-cent-registering wheel, and a dog for actuating said ten-cent wheel, of a series of operating-keys indicating odd multiples of five above the first power, connecting mechanism between all of said keys and actuating-dog, and connecting mechanism between all of said keys and the five-cent-registering wheel, whereby upon operating any one of said keys the tens of its value are registered on the ten-cent wheel and the five on the five-cent wheel, substantially as described.

11. In a cash register and indicator, the combination, with a five-cent-registering wheel, a ten-cent-registering wheel, and a vibrating dog-carrier and dog for actuating said ten-cent wheel, of a series of operating-keys indicating odd multiples of five above the first power, connecting mechanism between said keys and vibrating dog-carrier, and connecting mechanism between said keys and the five-cent registering wheel, whereby upon operating any one of said keys the tens of its value are registered on the ten-cent wheel and the five on the five-cent wheel, substantially as described.

12. In a cash register and indicator, the combination, with a five-cent-registering wheel, a ten-cent-registering wheel, and a vibrating dog-carrier and dog for actuating said ten-cent wheel, of a series of operating-keys indicating odd multiples of five above the first power, a series of arms connecting said keys and vibrating dog-carrier, and connecting mechanism between said keys and the five-cent-registering wheel, whereby upon operating any one of said keys the tens of its value are registered on the ten-cent wheel and the five on the five-cent wheel, substantially as described.

13. In a cash register and indicator, the combination, with a five-cent-registering wheel and a ten-cent-registering wheel, of a series of operating-keys indicating odd multiples of five above the first power, connecting mechanism between all of said keys and the ten-cent-registering wheel, and a five-cent bar actuated by all of said keys and arranged to actuate the five-cent-registering wheel, whereby upon operating any one of said keys the tens of its value are registered on the ten cent wheel and the five on the five cent wheel, substantially as described.

14. In a cash register and indicator, the combination, with a five-cent-registering wheel, a ten-cent-registering wheel, and a dog for actuating the ten-cent wheel, of a series of operating-keys indicating odd multiples of five above the first power, connecting mechanism between all of said keys and actuating-dog, and a five cent bar actuated by all of said keys and arranged to actuate the five-cent registering wheel, whereby upon operating any one of said keys the tens of its value are registered on the ten-cent wheel and the five on the five-cent wheel, substantially as described.

15. In a cash register and indicator, the combination, with a five-cent-registering wheel, a ten-cent-registering wheel, and a dog for actuating the ten-cent wheel, of a series of operating-keys indicating odd multiples of five above the first power, a series of arms secured to said keys, connecting mechanism between said arms and actuating-dog, and a five-cent bar actuated by said keys and arranged to actuate the five-cent-registering wheel, whereby upon operating any one of said keys the tens of its value are registered on the ten-cent wheel and the five on the five-cent wheel, substantially as described.

16. In a cash register and indicator, the combination, with a five-cent-registering wheel, a ten-cent-registering wheel, and a dog for actuating the ten-cent wheel, of a series of pivoted operating-keys indicating odd multiples of five above the first power, a series of arms pivoted to said keys at points unequally distant from the fulcrum of said keys, connecting mechanism between said arms and actuating-dog, and a five-cent bar actuated by said keys and arranged to actuate the five-cent-registering wheel, whereby upon operating any one of said keys the tens of its value are registered on the ten cent wheel and the five on the five-cent wheel, substantially as described.

17. In a cash register and indicator, the combination, with a five-cent-registering wheel, a ten-cent-registering wheel, and a vibrating dog-carrier and dog for actuating the ten-cent wheel, of a series of operating-keys indicating odd multiples of five above the first power, connecting mechanism between said keys and vibrating dog-carrier, and a five-cent bar actuated by said keys and arranged to actuate the five-cent wheel, whereby upon operating any one of said keys the tens of its value are registered on the ten-cent wheel and the five on the five-cent wheel, substantially as described.

18. In a cash register and indicator, the combination, with a five-cent-registering wheel, a ten-cent-registering wheel, and a vibrating dog-carrier and dog for actuating the ten-cent wheel, of a series of operating-keys indicating odd multiples of five above the first power, a series of arms connecting said keys and dog-carrier, and a five-cent bar actuated by said keys and arranged to actuate the five-cent-registering wheel, whereby upon operating any one of said keys the tens of its value are registered on the ten-cent wheel and the five on the five-cent wheel, substantially as described.

19. In a cash register and indicator, the combination, with a five-cent-registering wheel, a ten-cent-registering wheel, and a vibrating dog-carrier and dog for actuating the ten-cent wheel, of a series of pivoted operating-keys indicating odd multiples of five above the first power, a series of arms pivoted to the keys at points unequally distant from the fulcrum of the keys and connecting said keys with the vibrating dog-carrier, and a five cent bar arranged to actuate the five-cent wheel, whereby upon operating any one of said keys the tens of its value are registered on the ten-cent wheel and the five on the five-cent wheel, substantially as described.

20. In a cash register and indicator, the combination of a series of operating-keys indicating even multiples of five, another series of keys indicating odd multiples of five above the first power, a ten-cent-registering wheel and connecting mechanism between said wheel and all of the keys of both series, a five-cent-registering wheel, and connecting mechanism between said wheel and all the keys of the odd-numbered series, whereby upon operating an even-numbered key its value is registered on the ten-cent wheel, and whereby upon operating an odd-numbered key the tens of its value are registered on the ten-cent wheel and the five on the five-cent wheel, substantially as described.

21. In a cash register and indicator, the combination, with a five-cent-registering wheel, a ten-cent-registering wheel, and a dog for actuating said ten-cent wheel, of a series of operating-keys indicating both even and odd multiples of five above the first power, connecting mechanism between all of said keys and actuating-dog, and connecting mechanism between each of said odd-numbered keys and the five-cent-registering wheel, whereby upon operating an even-numbered key its value is registered on the ten-cent wheel, and whereby upon operating an odd-numbered key the tens of its value are registered on the ten-cent wheel and the five on the five-cent wheel, substantially as described.

22. In a cash register and indicator, the combination, with a five-cent-registering wheel, a ten-cent-registering wheel, and a vibrating dog-carrier and dog for actuating said ten-cent wheel, of a series of operating-keys indicating both even and odd multiples of five above the first power, connecting mechanism between said keys and vibrating dog carrier, and connecting mechanism between each of said odd-numbered keys and the five cent-registering wheel, whereby upon operating an even numbered key its value is registered on the ten-cent wheel, and whereby upon operating an odd-numbered key the tens of its value are registered on the ten-cent wheel and the five on the five-cent wheel, substantially as described.

23. In a cash register and indicator, the combination, with a five-cent-registering wheel, a ten-cent-registering wheel, and a vibrating dog-carrier and dog for actuating the ten-cent wheel, of a series of operating-keys indicating both even and odd multiples of five above the first power, a series of arms connecting said keys with the vibrating dog-carrier, and connecting mechanism between each of the odd-numbered keys and the five-cent registering wheel, whereby upon operating an even-numbered key its value is registered on the ten-cent wheel, and whereby upon operating an odd-numbered key the tens of its value are registered on the ten-cent wheel and the five on the five-cent wheel, substantially as described.

24. In a cash register and indicator, the combination, with a five-cent-registering wheel, a ten-cent-registering wheel, and a vibrating dog-carrier and dog for actuating the ten-cent wheel, of a series of pivoted operating-keys indicating both even and odd multiples of five above the first power, a series of arms secured to said keys at points unequally distant from the fulcrum of said keys and connecting them with the vibrating dog-carrier, and connecting mechanism between each of the odd-numbered keys and the five-cent-registering wheel, whereby upon operating an even-numbered key its value is registered on the ten-cent wheel, and whereby upon operating an odd-numbered key the tens of its value are registered on a ten-cent wheel and the five on the five-cent wheel, substantially as described.

25. In a cash register and indicator, the combination of a series of operating-keys indicating even multiples of five, another series of keys indicating odd multiples of five above the first power, a ten-cent-registering wheel, and connecting mechanism between said wheel and all the keys of both series, a five-cent-registering wheel, and a five-cent bar actuated by each of the odd-numbered keys and arranged to actuate the five-cent-registering wheel, whereby upon operating an even-numbered key its value is registered on the ten-cent wheel, and whereby upon operating an odd-numbered key the tens of its value are registered on the ten-cent wheel and the five on the five-cent wheel, substantially as described.

26. In a cash register and indicator, the combination, with a five-cent-registering wheel, a ten-cent-registering wheel, and a dog for actuating said ten-cent wheel, of a series of operating-keys indicating both even and odd multiples of five above the first power, connecting mechanism between all of said keys and actuating-dog, and a five-cent bar actuated by the keys indicating odd multiples of five and arranged to actuate the five-cent wheel, whereby upon operating an even-numbered key its value is registered on the ten-cent wheel, and whereby upon operating an odd-numbered key the tens of its value are registered on the ten-cent wheel and the five on the five-cent wheel, substantially as described.

27. In a cash register and indicator, the combination, with a five-cent-registering wheel, a ten-cent-registering wheel, and a vibrating dog-carrier and dog for actuating said ten-cent wheel, of a series of operating-keys indicating both even and odd multiples of five above the first power, connecting mechanism between said keys and vibrating dog-carrier, and a five-cent bar actuated by the keys indicating odd multiples of five and arranged to actuate the five-cent-registering wheel, whereby upon operating an even-numbered key its value is registered on the ten-cent wheel, and whereby upon operating an odd-numbered key the tens of its value are registered on the ten-cent wheel and the five on the five-cent wheel, substantially as described.

28. In a cash register and indicator, the combination, with a five-cent-registering wheel, a ten-cent-registering wheel, and a vibrating dog-carrier and dog for actuating the ten-cent wheel, of a series of operating-keys indicating both even and odd multiples of five above the first power, a series of arms connecting said keys with the vibrating dog-carrier, and a five-cent bar actuated by the keys indicating odd multiples of five and arranged to actuate the five-cent wheel, whereby upon operating an even-numbered key its value is registered on the ten-cent wheel, and whereby upon operating an odd-numbered key the tens of its value are registered on the ten-cent wheel and the five on the five-cent wheel, substantially as described.

29. In a cash register and indicator, the combination, with a five-cent-registering wheel, a ten-cent-registering wheel, and a vibrating dog-carrier and dog for actuating the ten-cent wheel, of a series of pivoted operating-keys indicating both even and odd multiples of five above the first power, a series of arms pivoted to said keys at points unequally distant from the fulcrum of said keys and connecting said keys with the vibrating dog-carrier, and a five-cent bar actuated by the keys indicating odd multiples of five and arranged to actuate the five-cent wheel, whereby upon operating an even-numbered key its value is registered on the ten-cent wheel, and whereby upon operating an odd-numbered key the tens of its value are registered on the ten-cent wheel and the five on the five cent wheel, substantially as described.

30. In a cash register and indicator, the combination, with a five-cent-registering wheel, a ten-cent-registering wheel, and a vibrating dog-carrier and dog for actuating the ten-cent wheel, of a series of operating-keys indicating five and the odd multiples thereof, connecting mechanism between said vibrating dog-carrier and each of said keys excepting the five-cent key, and a five-cent bar actuated by said keys and provided with a dog engaging with the five-cent wheel, whereby upon operating the five-cent key its value is registered on the five-cent wheel, and upon operating any other one of the keys the tens of its value are registered on the ten-cent wheel and the five on the five-cent wheel, substantially as described.

31. In a cash register and indicator, the combination, with a five-cent-registering wheel, a ten-cent-registering wheel, and a vibrating dog-carrier and dog for actuating the ten-cent wheel, of a series of operating-keys indicating five and the odd multiples thereof, a series of arms connecting said dog-carrier to all of the keys excepting the five-cent key, a five-cent bar actuated by each of the keys and provided with a dog engaging with the five-cent wheel, whereby upon operating the five-cent key its value is registered on the five-cent wheel, and upon operating any other one of the keys the tens of its value are registered on the ten-cent wheel and the five on the five-cent wheel, substantially as described.

32. In a cash register and indicator, the combination, with a five-cent-registering wheel, a ten-cent-registering wheel, and a vibrating dog-carrier and dog for actuating the ten-cent wheel, of a series of operating-keys indicating five and the even and odd multiples thereof, a series of arms connecting said dog-carrier to all of the keys excepting the five-cent key, and a five-cent bar actuated by each of the odd-numbered keys and provided with a dog engaging with the five-cent wheel, whereby upon operating the five-cent key its value is registered on the five-cent wheel, and upon operating any other one of the odd-numbered keys the tens of its value are registered on the ten-cent wheel and the five on the five-cent wheel, and whereby upon operating an even-numbered key its value is registered on the ten-cent wheel, substantially as described.

33. In a cash register and indicator, the combination, with a five-cent-registering wheel, a ten-cent-registering wheel, and a vibrating dog-carrier and dog for actuating the ten-cent wheel, of a series of pivoted operating-keys indicating five and the even and odd multiples thereof, a series of arms secured to all of said keys excepting the five-cent key at points unequally distant from the fulcrum of said keys and connecting said keys with the vibrating dog-carrier, and a five-cent bar actuated by each of the odd-numbered keys provided with a dog engaging with the five-cent wheel, whereby upon operating the five-cent key its value is registered on the five-cent wheel, and upon operating any other one of the odd-numbered keys the tens of its value are registered on the ten-cent wheel and the five on the five-cent wheel, and whereby upon operating an even-numbered key its value is registered on the ten-cent wheel, substantially as described.

34. In a cash register and indicator, the combination, with a series of registering-wheels and a series of vibrating dog-carriers and dogs for actuating said registering-wheels, and each of said dog-carriers being pivoted concentric with the axis of its registering-wheel, of a series of groups of pivoted operating-keys, one group for each registering-wheel, and a series of arms for each group pivoted at their lower ends to the keys of such group and engaging at their upper ends directly with the vibrating dog-carrier of such group for communicating different degrees of motion to said dog-carrier, whereby upon operating any key of a group its arm vibrates its dog-carrier to actuate its registering-wheel to register the value of such key, substantially as described.

35. In a cash register and indicator, the combination, with a series of registering-wheels and a series of vibrating dog-carriers and dogs for actuating said registering-wheels, of a series of groups of pivoted operating-keys, one group for each registering-wheel, and a series of arms pivoted to said keys at points unequally distant from the fulcrum of said keys and connecting the keys of each group with the vibrating dog-carrier of such group, whereby upon operating any key of a group its arm vibrates its dog-carrier to actuate the registering-wheel to register the value of such key, substantially as described.

36. In a cash register and indicator, the combination, with a five-cent registering wheel, a ten-cent-registering wheel, a dollar-registering wheel, and vibrating dog-carriers and dogs for actuating the ten-cent and dollar registering wheels, of a series of operating-keys indicating cents in even and odd multiples of five above the first power, a series of keys indicating dollars in multiples of one, connecting mechanism between the cent-keys and the vibrating dog-carrier of the ten-cent wheel, and connecting mechanism between the dollar-keys and the vibrating dog-carrier of the dollar-wheel, and a five-cent bar actuated by the cent keys, indicating odd multiples of five and arranged to actuate the five-cent-registering wheel, whereby upon operating any odd-numbered cent-key the tens of its value are registered on the ten-cent wheel and the five on the five-cent wheel, whereby upon operating any even-numbered cent-key its value is registered on the ten-cent wheel, and whereby upon operating any dollar-key its value is registered on the dollar-wheel, substantially as described.

37. In a cash register and indicator, the combination, with a five-cent-registering wheel, a ten cent-registering wheel, and a dollar-registering wheel, and vibrating dog-carriers and dogs for actuating the ten-cent and dollar registering wheels, of a series of operating-keys indicating cents in even and odd multiples of five above the first power, a series of keys indicating dollars in multiples of one, a series of arms connecting the cent-keys to the vibrating dog-carrier of the ten-cent wheel, and a series of arms connecting the dollar-keys to the vibrating dog-carrier of the dollar-wheel, and a five-cent bar actuated by the cent-keys indicating odd multiples of five and arranged to actuate the five-cent-registering wheel, substantially as and for the purpose set forth.

38. In a cash register and indicator, the combination, with a five cent-registering wheel, a ten-cent-registering wheel, a dollar registering wheel, and vibrating dog-carriers and dogs for actuating the ten-cent and dollar registering wheels, of a series of pivoted operating-keys indicating cents in even and odd multiples of five above the first power, a series of pivoted keys indicating dollars in multiples of one, a series of arms pivoted to the cent-keys at points unequally distant from the fulcrum of said keys and connecting said keys to the vibrating dog-carrier of the ten-cent wheel, a series of arms pivoted to the dollar-keys at points unequally distant from the fulcrum of said keys and connecting said keys to the vibrating dog-carrier of the dollar-wheel, and a five-cent bar actuated by the cent-keys indicating odd multiples of five and arranged to actuate the five-cent registering-wheel, substantially as and for the purpose set forth.

39. In a cash register and indicator, the combination, with a registering-wheel provided with teeth, a series of keys pivoted on a horizontal shaft at the front of the machine for actuating said wheel, and a vibrating bar pivoted on said shaft and actuated by the operation of any one of said keys, of a brake-dog arranged to engage with the teeth of said wheel, and connecting mechanism between said brake-dog and vibrating bar, whereby upon the operation of any one of said keys the brake-dog is actuated to engage with the teeth of the registering-wheel and form a positive stop therefor, substantially as described.

40. In a cash register and indicator, the combination, with a registering-wheel provided with teeth, a series of keys pivoted on a horizontal shaft at the front of the machine for actuating said wheel, and a vibrating bar pivoted on said shaft and actuated by the operation of any one of said keys, of a rock-shaft, a brake-dog secured thereto and arranged to engage with the teeth of said wheel, and connecting mechanism between said rock-shaft and vibrating bar, whereby upon the operation of any one of said keys the rock-shaft is oscillated to cause its brake-dog to engage with the teeth of said wheel, substantially as described.

41. In a cash register and indicator, the combination, with a registering-wheel provided with teeth, a series of keys for actuating said wheel, and a vibrating bar provided with a rearward extension and arranged to be actuated by the operation of any one of said keys, of a rock-shaft, a brake-dog secured to said rock-shaft and arranged to engage with the teeth of the registering-wheel, an arm secured to said rock-shaft, and a link connecting said arm and the rearward extension of the vibrating bar, whereby upon operating any one of said keys said rock-shaft is oscillated to cause its brake-dog to engage with the teeth of the registering-wheel, substantially as described.

42. In a cash register and indicator, the combination, with a registering-wheel provided with teeth, a vibrating dog-carrier and dog for actuating said wheel, a series of operating-keys, and a series of arms secured to said keys and independently connecting each of them to said vibrating dog-carrier, of a brake-dog arranged to engage with the teeth of the registering-wheel, a vibrating bar actuated by the operation of any of said keys, and connecting mechanism between said vibrating bar and brake-dog, substantially as and for the purpose described.

43. In a cash register and indicator, the combination, with a registering-wheel provided with teeth, a vibrating dog-carrier and dog for actuating said wheel, a series of pivoted operating-keys, and a series of arms pivoted to said keys at points unequally distant from the fulcrum of said keys and connecting said keys with the vibrating dog-carrier, of a brake-dog arranged to engage with the teeth of the registering-wheel, a vibrating bar actuated by the operation of any one of said keys, and connecting mechanism between said vibrating bar and brake-dog, substantially as and for the purpose described.

44. In a cash register and indicator, the combination, with a registering-wheel provided with teeth, a vibrating dog-carrier and dog for actuating said wheel, a series of operating-keys, and a series of arms connecting said keys and vibrating dog-carrier, of a rock-shaft, a brake-dog secured to the rock-shaft and arranged to engage with the teeth of the registering-wheel, an arm secured to said rock-shaft, a vibrating bar actuated by the operation of any one of said keys, and connecting mechanism between said vibrating bar and arm, substantially as and for the purpose described.

45. In a cash register and indicator, the combination, with a registering-wheel provided with teeth, a vibrating dog-carrier and dog for actuating said wheel, a series of pivoted operating-keys, and a series of arms pivoted to said keys at points unequally distant from the fulcrum of said keys and connecting the keys with the vibrating dog-carrier, of a rock-shaft, a brake-dog secured to said rock-shaft and arranged to engage with the teeth of the registering-wheel, an arm secured to said shaft, a vibrating bar actuated by the operation of any one of said keys, and connecting mechanism between said vibrating bar and arm, substantially as and for the purpose described.

46. In a cash register and indicator, the combination, with a series of registering-wheels provided with teeth, a vibrating dog-carrier and dog for each wheel, a series of groups of operating-keys, one group for each wheel, and a series of arms connecting the keys of each group with the vibrating dog-carrier of its registering-wheel, of a rock-shaft journaled in the frame of the machine and extending across all of the registering-wheels, a series of brake-dogs, one for each wheel, supported on said rock-shaft and each arranged to engage with the teeth of its registering-wheel, an arm secured to said rock-shaft, a vibrating bar actuated by the depression of any key, and connecting mechanism between said bar and the arm secured to the rock-shaft, substantially as and for the purpose described.

47. In a cash register and indicator, the combination, with a registering-wheel provided with teeth, a vibrating dog-carrier and dog for actuating said wheel, a series of operating-keys, and a series of arms connecting said keys and the vibrating dog-carrier, of a shaft, a sleeve loose upon said shaft, a brake-dog secured to said sleeve and arranged to engage with the teeth of the registering-wheel, an arm secured to said sleeve, a vibrating bar actuated by the operation of any of said keys, and connecting mechanism between the vibrating bar and the arm secured to the sleeve, substantially as and for the purpose described.

48. In a cash register and indicator, the combination, with a series of registering-wheels provided with teeth, a vibrating dog-carrier and dog for each wheel, a series of groups of operating-keys, one group for each wheel, and a series of arms connecting the keys of each group with the vibrating dog-carrier of its registering wheel, of a shaft extending across said registering-wheels, a series of sleeves loose upon said shaft, one sleeve for each registering-wheel, a brake-dog secured to each sleeve and arranged to engage with the teeth of its registering-wheel, an arm secured to each sleeve, a vibrating bar for each group of keys and actuated by the operation of any key of its group, and connecting mechanism between the vibrating bar and the arm secured to its corresponding sleeve, substantially as and for the purpose described.

49. In a cash register and indicator, the combination of a registering-wheel bearing one or more series of numbers on its periphery, a vibrating dog-carrier and dog for actuating said wheel, a series of operating-keys, a series of arms connecting said keys and vibrating dog-carrier, a supplemental registering-disk arranged in a plane tangential to the periphery of the registering-wheel and adjacent thereto and bearing a series of numbers in multiples of the amount registered by each series of numbers on the registering-wheel, and a projection on said registering-wheel for each series of numbers, arranged to engage with said disk and turn it one number for each complete series of numbers on said wheel, substantially as described.

50. In a cash register and indicator, the combination of a registering-wheel bearing one or more series of numbers on its periphery and a reading-opening through which said numbers are exposed one at a time, a vibrating dog-carrier and dog for actuating said wheel, a series of pivoted operating-keys, a series of arms pivoted at their lower ends to said keys at points unequally distant from the fulcrum of said keys and connecting said keys with the vibrating dog-carrier, a supplemental registering-disk arranged in a plane tangential to the periphery of the registering-wheel and adjacent thereto and bearing a series of numbers in multiples of the amount registered by each series of numbers on the registering-wheel, said numbers being exposed through the reading-opening one at a time, and a projection on the registering-wheel for each series of numbers, arranged to engage with said disk and turn it one number for each complete series of numbers on said registering-wheel, substantially as described.

51. In a cash register and indicator, the combination of a registering wheel bearing one or more series of numbers on its periphery and a reading-opening through which said numbers are exposed one at a time, a vibrating dog-carrier and dog for actuating said wheel, a series of operating-keys, connecting mechanism between said keys and vibrating dog-carrier, a supplemental registering-disk arranged in a plane tangential to the periphery of the registering-wheel and adjacent thereto and bearing a series of numbers in multiples of the amount registered by each series of numbers on the registering-wheel, said numbers being exposed through the reading-opening one at a time, and a projection on the registering-wheel for each series of numbers, arranged to turn said disk one number for each series of numbers on said wheel, the numbers on the registering wheel and disk being so arranged that the two numbers exposed through the reading-opening coincide to indicate at all times, without addition, the total amount registered on said wheel and disk, substantially as described.

52. In a cash register and indicator, the combination of a series of registering-wheels, each provided with one or more series of numbers on its periphery, a series of vibrating dog-carriers and dogs, one for each wheel, a series of operating-keys and connecting mechanism between said keys and vibrating dog-carriers, a plate extending across all of said registering-wheels and provided with a series of reading-openings, one for each wheel, through which opening the numbers on its corresponding wheel are exposed one at a time, a series of supplemental registering-disks on the under side of said plate, one for each registering-wheel and arranged adjacent thereto, each provided with a series of numbers in multiples of the amount registered by each series of numbers on its corresponding registering-wheel, said numbers being exposed through its reading-opening one at a time, and a projection on each registering-wheel for each series of numbers on said wheel arranged to engage with and turn its corresponding disk one number for each complete series of numbers on said wheel, substantially as described.

53. In a cash register and indicator, the combination of a series of registering-wheels, each provided with one or more series of numbers on its periphery, a series of vibrating dog carriers and dogs, one for each wheel, a series of operating-keys, a series of arms pivoted to said keys and connecting them with the vibrating dog-carriers, a plate extending across all of said registering-wheels and provided with a series of reading-openings, one for each wheel, through which opening the numbers on its corresponding wheel are exposed one at a time, a series of supplemental registering-disks on the under side of said plate, one for each registering-wheel and arranged adjacent thereto, each provided with a series of numbers in multiples of the amount registered by each series of numbers on its corresponding registering-wheel, said numbers being exposed through its reading opening one at a time, and a projection on each registering-wheel for each series of numbers on said wheel, arranged to engage with and turn its corresponding disk one number for each complete series of numbers on said wheel, the numbers on each registering-wheel and its corresponding disk being so arranged that the two numbers exposed through the reading opening coincide to indicate at all times without addition the total amount registered on said wheel and disk, substantially as described.

54. In a cash register and indicator, the combination of a five-cent-registering wheel, a ten-cent-registering wheel, a dollar-registering wheel, vibrating dog-carriers and dogs for actuating the ten-cent and dollar wheels, a series of operating-keys indicating cents in even and odd multiples of five above the first power, a series of keys indicating dollars in multiples of one, connecting mechanism between the cent-keys and the vibrating dog-carrier of the ten-cent wheel, and connecting mechanism between the dollar-keys and the vibrating dog-carrier of the dollar-wheel, a five-cent bar actuated by the cent keys which indicate odd multiples of five and arranged to actuate the five-cent-registering wheel, a plate extending across all of said wheels and provided with a series of reading-openings, one for each wheel, through which openings the numbers on its corresponding wheel are exposed one at a time, a series of supplemental registering-disks on the under side of said plate, one for each registering-wheel and arranged adjacent thereto, each provided with a series of numbers in multiples of the amount registered by each series of numbers on its corresponding registering-wheel, said numbers being exposed through its reading opening one at a time, and a projection on each registering-wheel for each series of numbers on said wheel, arranged to engage with and turn its corresponding registering-disk one number for each complete series of numbers on said wheel, substantially as described.

55. In a cash register and indicator, the combination, with a series of operating-keys, of a series of stops arranged to permit the operation of one key at a time and to prevent the operation of two or more keys simultaneously, substantially as described.

56. In a cash register and indicator, the combination, with a series of operating-keys, of a series of movable stops arranged to permit the operation of one key at a time and to engage with said keys to prevent the operation of two or more of them simultaneously, substantially as described.

57. In a cash register and indicator, the combination, with a series of operating-keys, of a series of pendent stops pivoted above said keys and arranged to engage therewith to prevent the operation of two or more of them simultaneously, substantially as described.

58. In a cash register and indicator, the combination, with a series of operating keys, of a series of pendent wedge-shaped stops arranged to engage with said keys to prevent the operation of two or more of them simultaneously, substantially as described.

59. In a cash register and indicator, the combination, with a series of operating-keys, of a series of pendent wedge-shaped stops pivoted above said keys and arranged to engage therewith to prevent the operation of two or more of them simultaneously, substantially as described.

60. In a cash register and indicator, the combination, with a series of operating-keys, of a series of movable stops arranged to be displaced upon the operation of a single key to permit such operation, but locking two or more keys when the latter are attempted to be operated simultaneously, substantially as described.

61. In a cash register and indicator, the combination, with a registering-wheel and a series of keys for operating said wheel, of a series of stops arranged to permit the operation of one key at a time, but to at all times prevent the simultaneous operation of two or more keys, substantially as described.

62. In a cash register and indicator, the combination, with a registering-wheel and a series of keys for operating said wheel, of a series of stops arranged to permit the operation of one key at a time, but by engaging them to at all times prevent the simultaneous operation of two or more keys, substantially as described.

63. In a cash register and indicator, the combination, with a registering-wheel and a series of keys for operating said wheel, of a series of movable stops arranged to permit the operation of one key at a time, but to at all times prevent the simultaneous operation of two or more keys, substantially as described.

64. In a cash register and indicator, the combination, with a registering-wheel and a series of keys for operating said wheel, of a series of pendent wedge-shaped stops arranged to engage with said keys to prevent the operation of two or more of them simultaneously, substantially as described.

65. In a cash register and indicator, the combination, with a registering-wheel and a series of keys for operating said wheel, of a series of pendent stops pivoted above said keys and arranged to engage therewith to prevent the operation of two or more of them simultaneously, substantially as described.

66. In a cash register and indicator, the combination, with a registering-wheel and a series of keys for operating said wheel, of a series of pendent wedge-shaped stops pivoted above said keys and arranged to engage therewith to prevent the operation of two or more of them simultaneously, substantially as described.

67. In a cash register and indicator, the combination, with a registering-wheel and a series of keys for operating said wheel, of a series of movable stops arranged to be displaced upon the operation of a single key to permit such operation, but locking two or more keys when the latter are attempted to be operated simultaneously, substantially as described.

68. In a cash register and indicator, the combination, with a registering-wheel, a vibrating dog-carrier and dog for actuating said wheel, a series of operating-keys, and connecting mechanism between said keys and vibrating dog-carrier, of a series of stops arranged to prevent the operation of two or more of said keys simultaneously, substantially as described.

69. In a cash register and indicator, the combination, with a registering-wheel, a vibrating dog-carrier and dog for actuating said wheel, a series of operating-keys, and a series of arms connecting said keys to the vibrating dog-carrier, of a series of stops arranged to engage with said keys to prevent the operation of two or more of them simultaneously, substantially as described.

70. In a cash register and indicator, the combination, with a series of registering-wheels and a series of groups of keys for operating said wheels, one group of keys for each wheel, of a series of sets of stops arranged to prevent the operation of two or more keys of a group simultaneously, but permitting the simultaneous operation of two or more keys of different groups, substantially as described.

71. In a cash register and indicator, the combination, with a series of registering-wheels and a series of groups of keys for operating said wheels, one group of keys for each wheel, of a series of sets of stops arranged to engage with said keys to prevent the operation of two or more keys of a group simultaneously, but permitting the simultaneous operation of two or more keys of different groups, substantially as described.

72. In a cash register and indicator, the combination, with a series of registering-wheels and a series of groups of keys for operating said wheels, one group of keys for each wheel, of a series of sets of pendent wedge-shaped stops arranged to engage with said keys to prevent the operation of two or more keys of a group simultaneously, but permitting the simultaneous operation of two or more keys of different groups, substantially as described.

73. In a cash register and indicator, the combination, with a series of registering-wheels and a series of groups of keys for operating said wheels, one group of keys for each wheel, of a series of sets of pendent stops pivoted above said keys and arranged to engage therewith to prevent the operation of two or more keys of a group simultaneously, but permitting the simultaneous operation of two or more keys of different groups, substantially as described.

74. In a cash register and indicator, the combination, with a registering-wheel, a series of operating keys, a series of tablet-rods and indicating-tablets, one for each key, a vibrating dog-carrier and dog for actuating said registering-wheel, and a series of arms pivoted at their lower ends directly to said keys and provided at their upper ends with slots embracing said vibrating dog-carrier, whereby upon operating any one of said keys its indicating-tablet is exposed to view and its arm vibrates the dog-carrier to cause its dog to actuate the registering-wheel to register the value of such key, substantially as described.

75. In a cash register and indicator, the combination of a registering-wheel, a dog for actuating said wheel, a series of pivoted keys, a series of tablet-rods and indicating-tablets actuated by said keys, a series of arms connected to said keys at points unequally distant from the fulcrum of said keys, and connecting mechanism between said arms and actuating-dog, whereby upon operating any one of said keys its indicating-tablet is exposed to view and its value is registered on said registering-wheel, substantially as described.

76. In a cash register and indicator, the combination of a registering-wheel, a series of pivoted operating-keys, a series of tablet-rods and indicating-tablets, one for each key, a vibrating dog-carrier and dog for actuating said registering-wheel, and a series of arms pivoted to said keys at points unequally distant from the fulcrum of said keys and connecting them to the vibrating dog-carrier, whereby upon operating any one of said keys its indicating-tablet is exposed to view and its arm vibrates the dog-carrier to cause its dog to actuate the registering-wheel to register the value of such key, substantially as described.

77. In a cash register and indicator, the combination of a registering-wheel, a series of pivoted operating-keys, a series of tablet-rods and indicating-tablets, one for each key, a vibrating dog-carrier and dog for actuating said registering-wheel, and a series of arms connected at their lower ends to said keys at points unequally distant from the fulcrum of said keys and provided at their upper ends with slots embracing said vibrating dog-carrier, whereby upon operating any one of said keys its indicating-tablet is exposed to view and its arm vibrates the dog-carrier to cause its dog to actuate the registering-wheel to register the value of such key, substantially as described.

78. In a cash register and indicator, the combination of a registering-wheel, a series of operating-keys, a series of tablet-rods and indicating-tablets actuated thereby, a vibrating dog-carrier hung concentric with said registering-wheel and provided with a dog for actuating said wheel, and a series of arms pivoted at their lower ends to said keys and engaging at their upper ends directly with said vibrating dog-carrier for communicating different degrees of motion thereto, whereby upon operating any one of said keys its indicating-tablet is exposed to view and its arm vibrates the dog-carrier to cause its dog to actuate the registering-wheel to register the value of such key, substantially as described.

79. In a cash register and indicator, the combination of a registering-wheel, a series of operating-keys, a series of tablet-rods and indicating-tablets actuated thereby, a vibrating dog-carrier hung concentric with said registering-wheel and provided with a dog for actuating said wheel, and a series of arms pivoted at their lower ends directly to said keys and provided at their upper ends with slots which embrace said vibrating dog-carrier, whereby upon operating any one of said keys its indicating-tablet is exposed to view and its arm vibrates the dog-carrier to cause its dog to actuate the registering-wheel to register the value of such key, substantially as described.

80. In a cash register and indicator, the combination of a registering-wheel, a series of pivoted operating-keys, a series of tablet-rods and indicating-tablets actuated thereby, a vibrating dog-carrier hung concentric with said registering-wheel and provided with a dog for actuating said wheel, and a series of arms connected at their lower ends to said keys at points unequally distant from the fulcrum of said keys and connected at their upper ends to said vibrating dog-carrier, whereby upon operating any one of said keys its indicating-tablet is exposed to view and its arm vibrates the dog-carrier to cause its dog to actuate the registering-wheel to register the value of such key, substantially as described.

81. In a cash register and indicator, the combination of a registering-wheel, a series of pivoted operating-keys, a series of tablet-rods and indicating-tablets actuated thereby, a vibrating dog-carrier hung concentric with said registering-wheel and provided with a dog for actuating said wheel, and a series of arms connected at their lower ends to said keys at points unequally distant from the fulcrum of said keys and provided at their upper ends with slots embracing said vibrating dog-carrier, whereby upon operating any one of said keys its indicating-tablet is exposed to view and its arm vibrates the dog-carrier to cause its dog to actuate the registering-wheel to register the value of such key, substantially as described.

82. In a cash register and indicator, the combination of a series of operating-keys indicating odd multiples of five above the first power, a series of tablet-rods and indicating-tablets, one for each key, a ten-cent-registering wheel common to all the keys of said series and connecting mechanism between said keys and registering-wheel, a five-cent-registering wheel, and connecting mechanism between said wheel and all of the keys of said series, whereby upon operating any one of the keys of said series its indicating-tablet is exposed to view and the tens of its value are registered on the ten-cent wheel and the five on the five-cent wheel, substantially as described.

83. In a cash register and indicator, the combination of a series of operating-keys indicating odd multiples of five above the first power, a series of tablet-rods and indicating-tablets, one for each key, a ten-cent-registering wheel common to all the keys of said series and connecting mechanism between said keys and registering-wheel, a five-cent-registering wheel, and a five-cent bar actuated by each of the keys of said series and arranged to actuate the five-cent-registering wheel, whereby upon operating any one of said keys the tens of its value are registered on the ten-cent wheel and the five on the five-cent wheel, substantially as described.

84. In a cash register and indicator, the combination of a five-cent-registering wheel, a ten-cent-registering wheel, a vibrating dog-carrier and dog for actuating the ten-cent wheel, a series of operating-keys indicating odd multiples of five above the first power, a series of tablet-rods and indicating-tablets, one for each key, connecting mechanism between said keys and vibrating dog-carrier, and a five-cent bar arranged to be operated by said keys to actuate the five-cent-registering wheel, whereby upon operating any one of said keys its indicating-tablet is exposed to view and the tens of its value are registered on the ten-cent wheel and the five on the five-cent wheel, substantially as described.

85. In a cash register and indicator, the combination of a five-cent-registering wheel, a ten-cent-registering wheel, a vibrating dog-carrier and dog for actuating the ten-cent wheel, a series of operating-keys indicating odd multiples of five above the first power, a series of tablet-rods and indicating-tablets, one for each key, a series of arms connecting said keys to the vibrating dog-carrier, and a five-cent bar arranged to be operated by said keys to actuate the five-cent-registering wheel, whereby upon operating any one of said keys its indicating-tablet is exposed to view, and the tens of its value are registered on the ten-cent wheel and the five on the five-cent wheel, substantially as described.

86. In a cash register and indicator, the combination of a five-cent-registering wheel, a ten-cent-registering wheel, a vibrating dog-carrier and dog for actuating the ten-cent wheel, a series of pivoted operating-keys indicating odd multiples of five above the first power, a series of tablet-rods and indicating tablets, one for each key, a series of arms connected at their lower ends to said keys at points unequally distant from the fulcrum of said keys and engaging at their upper ends with the vibrating dog-carrier, and a five-cent bar arranged to be operated by said keys to actuate the five-cent-registering wheel, whereby upon operating any one of said keys its indicating-tablet is exposed to view and the tens of its value are registered on the ten-cent wheel and the five on the five-cent wheel, substantially as described.

87. In a cash register and indicator, the combination of a series of operating-keys indicating even multiples of five, another series of keys indicating odd multiples of five above the first power, a series of tablet-rods and indicating-tablets, one for each key, a ten-cent-registering wheel and connecting mechanism between said wheel and all the keys of both series, a five-cent-registering wheel, and connecting mechanism between said wheel and all the keys of the odd-numbered series, whereby upon operating an even-numbered key its indicating-tablet is exposed to view and its value is registered on the ten-cent wheel, and whereby upon operating an odd-numbered key its indicating-tablet is exposed to view and the tens of its value are registered on the ten-cent wheel and the five on the five-cent wheel, substantially as described.

88. In a cash register and indicator, the combination of a five-cent-registering wheel, a ten-cent-registering wheel, a dog for actuating the ten-cent wheel, a series of operating-keys indicating both even and odd multiples of five above the first power, a series of tablet-rods and indicating-tablets, one for each key, connecting mechanism between all of said keys and actuating-dog, and a five-cent bar arranged to be operated by each of said odd-numbered keys to actuate the five cent-registering wheel, whereby upon operating an even-numbered key its indicating-tablet is exposed to view and its value is registered on the ten-cent wheel, and whereby upon operating an odd-numbered key its indicating-tablet is exposed to view and the tens of its value are registered on the ten-cent wheel and the five on the five-cent wheel, substantially as described.

89. In a cash register and indicator, the combination of a five-cent-registering wheel, a ten-cent-registering wheel, a vibrating dog-carrier and dog for actuating the ten-cent wheel, a series of operating-keys indicating both even and odd multiples of five above the first power, a series of tablet-rods and indicating-tablets, one for each key, a series of arms connecting said keys to the vibrating dog-carrier, and a five-cent bar arranged to be operated by the keys indicating odd multiples of five to actuate the five-cent registering wheel, whereby upon operating an even-numbered key its indicating-tablet is exposed to view and its value is registered on the ten-cent wheel, and whereby upon operating an odd-numbered key its indicating-tablet is exposed to view and the tens of its value are registered on the ten-cent wheel and the five on the five-cent wheel, substantially as described.

90. In a cash register and indicator, the combination of a five-cent-registering wheel, a ten-cent-registering wheel, a vibrating dog-carrier and dog for actuating the ten-cent wheel, a series of pivoted operating-keys indicating both even and odd multiples of five above the first power, a series of tablet-rods and indicating-tablets, one for each key, a series of arms pivoted to said keys at points unequally distant from the fulcrum of said keys and connecting said keys to the vibrating dog-carrier, and a five-cent bar arranged to be operated by the keys indicating odd multiples of five to actuate the five-cent registering wheel, whereby upon operating an even-numbered key its indicating-tablet is exposed to view and its value is registered on the ten-cent wheel, and whereby upon operating an odd-numbered key its indicating-tablet is exposed to view and the tens of its value are registered on the ten-cent wheel and the five on the five-cent wheel, substantially as described.

91. In a cash register and indicator, the combination, with a five-cent-registering wheel, a ten-cent-registering wheel, a dollar-registering wheel, and vibrating dog-carriers and dogs for actuating the ten-cent and dollar registering wheels, of a series of operating-keys indicating cents in even and odd multiples of five above the first power, a series of keys indicating dollars in multiples of one, a series of tablet-rods and indicating-tablets actuated by said keys, connecting mechanism between the cent-keys and the vibrating dog-carrier of the ten-cent wheel, and connecting mechanism between the dollar-keys and the vibrating dog-carrier of the dollar-wheel, and a five-cent bar actuated by the cent-keys indicating odd multiples of five and arranged to actuate the five-cent-registering wheel, substantially as and for the purpose described.

92. In a cash register and indicator, the combination, with a five-cent-registering wheel, a ten-cent-registering wheel, a dollar-registering wheel, and vibrating dog-carriers and dogs for actuating the ten-cent and dollar wheels, of a series of operating-keys indicating cents in even and odd multiples of five above the first power, a series of keys indicating dollars in multiples of one, a series of tablet-rods and indicating-tablets actuated by said keys, a series of arms connecting the cent-keys to the vibrating dog-carrier of the ten-cent wheel, a series of arms connecting the dollar-keys to the vibrating dog-carrier of the dollar-wheel, a five-cent bar actuated by the cent-keys indicating odd multiples of five, and provided with a dog engaging with the five-cent-registering wheel, substantially as and for the purpose described.

93. In a cash register and indicator, the combination, with a five-cent-registering wheel, a ten-cent-registering wheel, a dollar-registering wheel, and vibrating dog-carriers and dogs for actuating the ten-cent and dollar wheels, of a series of pivoted operating-keys indicating cents in even and odd multiples of five above the first power, a series of keys indicating dollars in multiples of one, a series of tablet-rods and indicating-tablets actuated by said keys, a series of arms pivoted to said keys at points unequally distant from the fulcrum of said keys, the arms of the cent-keys being connected to the vibrating dog-carrier of the ten-cent wheel and the arms of the dollar-keys to the vibrating dog-carrier of the dollar-wheel, and a five-cent bar actuated by the cent-keys indicating odd multiples of five, and provided with a dog engaging with the five-cent-registering wheel, substantially as and for the purpose described.

94. In a cash register and indicator, the combination of a registering-wheel provided with a ratchet, a series of keys for actuating said wheel, a series of tablet-rods and indicating-tablets actuated by said keys, a brake-dog arranged to engage with the ratchet of said wheel, but normally out of contact therewith, and mechanism connecting the brake dog with the keys, whereby upon operating any one of the keys its indicating-tablet is exposed to view and the brake-dog is positively actuated to engage with the teeth of the registering-wheel and form a positive stop therefor, substantially as described.

95. In a cash register and indicator, the combination of a registering-wheel provided with a ratchet, a series of keys for actuating said wheel, a series of tablet-rods and indicating-tablets actuated by said keys, a vibrating bar actuated by the operation of any one of said keys, a brake-dog arranged to engage with the ratchet of said wheel, and connecting mechanism between said brake-dog and vibrating bar, whereby upon the operation of any one of said keys its indicating-tablet is exposed to view and the brake-dog is actuated to engage with the ratchet of the registering-wheel and form a positive stop therefor, substantially as described.

96. In a cash register and indicator, the combination of a registering-wheel provided with a ratchet, a series of keys for actuating said wheel, a series of tablet-rods and indicating-tablets actuated by said keys, a vibrating bar actuated by the operation of any one of said keys, a rock-shaft, a brake-dog secured thereto and arranged to engage with the ratchet of said wheel, and connecting mechanism between said rock-shaft and vibrating bar, whereby upon operating any one of said keys its indicating-tablet is exposed to view and the rock-shaft is oscillated to cause its brake-dog to engage with the teeth of said wheel, substantially as described.

97. In a cash register and indicator, the combination of a registering-wheel provided with teeth, a vibrating dog-carrier and dog for actuating said wheel, a series of operating-keys, a series of tablet-rods and indicating-tablets, one for each key, a series of arms connecting said keys with the vibrating dog-carrier, a brake-dog arranged to engage with the teeth of the registering-wheel, a vibrating bar actuated by the operation of any of said keys, and connecting mechanism between said vibrating bar and brake-dog, substantially as and for the purpose described.

98. In a cash register and indicator, the combination of a registering wheel, a series of keys for operating said wheel, a series of tablet-rods and indicating-tablets actuated by said keys, and a series of stops arranged to permit the operation of any one key, but to at all times prevent the simultaneous operation of two or more keys, substantially as described.

99. In a cash register and indicator, the combination of a registering-wheel, a series of keys for operating said wheel, a series of tablet-rods and indicating-tablets actuated by said keys, and a series of pendent stops pivoted above said keys and arranged to engage therewith to prevent the operation of two or more of them simultaneously, substantially as described.

100. In a cash register and indicator, the combination of a registering-wheel, a vibrating dog-carrier and dog for actuating said wheel, a series of operating-keys, a series of tablet-rods and indicating-tablets actuated by said keys, connecting mechanism between said keys and vibrating dog-carrier, and a series of stops arranged to prevent the operation of two or more keys simultaneously, substantially as described.

101. In a cash register and indicator, the combination of a registering-wheel, a vibrating dog-carrier and dog for actuating said wheel, a series of operating-keys, a series of tablet-rods and indicating-tablets, one for each key, a series of arms connecting said keys with the vibrating dog-carrier, and a series of stops arranged to engage with said keys to prevent the operation of two or more of them simultaneously, substantially as described.

102. In a cash register and indicator, the combination of a registering-wheel, a vibrating dog-carrier and dog for actuating said wheel, a series of pivoted operating-keys, a series of tablet-rods and indicating-tablets, one for each key, a series of arms pivoted to said keys at points unequally distant from said keys and connecting said keys with the vibrating dog-carrier, and a series of pendent stops arranged to engage with the rear ends of said keys to prevent the operation of two or more of them simultaneously, substantially as described.

103. In a cash register and indicator, the combination of a series of registering-wheels, a series of groups of keys for operating said wheels, one group of keys for each wheel, a series of tablet-rods and indicating-tablets actuated by said keys, and a series of sets of stops arranged to prevent the operation of two or more keys of a group simultaneously, but permitting the simultaneous operation of two or more keys of different groups, substantially as described.

104. In a cash register and indicator, the combination of a series of registering-wheels, a series of vibrating dog-carriers and dogs for actuating said wheels, a series of groups of operating-keys, one group of keys for each wheel, a series of tablet-rods and indicating-tablets actuated by said keys, connecting mechanism between each group of keys and its corresponding dog-carrier, and a series of sets of stops arranged to prevent the operation of two or more keys of a group simultaneously, but permitting the simultaneous operation of two or more keys of different groups, substantially as described.

105. In a cash register and indicator, the combination of a series of registering-wheels, a series of vibrating dog-carriers and dogs for actuating said wheels, a series of groups of pivoted operating-keys, one group of keys for each wheel, a series of tablet-rods and indicating-tablets actuated by said keys, a series of arms connecting the keys of each group with its corresponding dog-carrier, and a series of sets of pendent stops arranged to engage with the rear ends of the keys of each group to prevent the operation of two or more keys of a group simultaneously, but permitting the simultaneous operation of two or more keys of different groups, substantially as described.

106. In a cash register and indicator, the combination of a registering-wheel, a vibrating dog-carrier and dog for actuating said wheel, a series of operating-keys, a series of tablet-rods and indicating-tablets, one for each key, a series of arms connecting said keys with the vibrating dog-carrier, a brake-dog arranged to engage with the teeth of the registering-wheel, a vibrating bar actuated by the operation of any one of said keys, connecting mechanism between said vibrating bar and brake-dog, and a series of stops arranged to engage with said keys to prevent the operation of two or more of them simultaneously, substantially as described.

107. In a cash register and indicator, the combination of a five-cent-registering wheel, a ten-cent-registering wheel, a dollar-registering wheel, vibrating dog-carriers and dogs for actuating the ten-cent and dollar wheels, a series of operating keys indicating cents in even and odd multiples of five above the first power, a series of keys indicating dollars in multiples of one, a series of tablet-rods and indicating-tablets, one for each key, a series of arms connecting the cent-keys with the vibrating dog-carrier of the ten-cent wheel, and a series of arms connecting the dollar-keys with the vibrating dog-carrier of the dollar-wheel, a five-cent bar engaging with the cent-keys which indicate odd multiples of five and provided with a dog engaging with the five-cent wheel, a series of brake-dogs, one for each registering-wheel and arranged to engage with the teeth thereof, a vibrating bar actuated by the operation of the keys, connecting mechanism between said vibrating bar and brake-dogs, and two sets of stops, those of one set being arranged to engage with the dollar-keys and those of the other set with the cent-keys, substantially as and for the purpose described.

108. In a cash register and indicator, the combination of a series of registering-wheels provided with teeth, a series of vibrating dog-carriers and dogs for actuating said registering-wheels, a series of groups of operating-keys, one group for each registering-wheel, a series of tablet-rods and indicating-tablets, one for each key, a series of arms connecting the keys of each group with the vibrating dog-carrier of that group, a series of brake-dogs, one for each registering-wheel and arranged to engage with the teeth thereof, a series of vibrating bars, one for each group of keys, arranged to be actuated by the operation of any key of its group, connecting mechanism between each vibrating bar and the brake-dog of the corresponding registering-wheel, two sets of stops, those of one set arranged to engage with the dollar-keys and those of the other set with the cent-keys, a plate extending across the peripheries of all the registering-wheels and provided with a series of reading-openings, one for each wheel, and a series of supplemental registering-disks pivoted to the under side of said plate adjacent to the reading-openings, one for each registering-wheel and arranged to be turned one notch at each revolution of the registering-wheel, substantially as and for the purpose described.

109. The combination, with the gong-hammer $v$, provided with a laterally-projecting pin, $u$, of the trip-bar $s$, normally engaging with said pin and pivoted to the vibrating frame J, and the block w, engaging with the incline upon the trip-bar to disengage the same from the pin u, substantially as and for the purpose described.

110. The combination, with the vibrating frame J and the drawer p, provided with a pin, q, of the pivoted locking-bar n, arranged to engage with the vibrating frame when the drawer is open, to prevent the operation of the machine and to be thrown out of the way of the vibrating frame by the pin q when the drawer is closed, substantially as described.

JOHN F. HEADY.
JOHN H. PATTERSON.

Witnesses to John F. Heady's signature:
N. LINDENFELD,
S. B. LOCKWOOD.

Witnesses to John H. Patterson's signature:
HENRY THEOBALD,
THOS. CORWIN.